(12) United States Patent
Hammad

(10) Patent No.: US 9,552,581 B2
(45) Date of Patent: *Jan. 24, 2017

(54) SECURE COMMUNICATION OF PAYMENT INFORMATION TO MERCHANTS USING A VERIFICATION TOKEN

(71) Applicant: Visa International Service Association, San Francisco, CA (US)

(72) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/511,034

(22) Filed: Oct. 9, 2014

(65) Prior Publication Data

US 2015/0134537 A1     May 14, 2015

Related U.S. Application Data

(63) Continuation of application No. 12/878,947, filed on Sep. 9, 2010, now Pat. No. 8,893,967, and a
(Continued)

(51) Int. Cl.

| | |
|---|---|
| *G06Q 20/40* | (2012.01) |
| *G06F 21/34* | (2013.01) |
| *G06F 21/42* | (2013.01) |
| *G06Q 20/12* | (2012.01) |
| *G06Q 20/20* | (2012.01) |
| *G06Q 20/32* | (2012.01) |

(Continued)

(52) U.S. Cl.
CPC ........... *G06Q 20/4014* (2013.01); *G06F 21/34* (2013.01); *G06F 21/42* (2013.01); *G06Q 20/12* (2013.01); *G06Q 20/20* (2013.01); *G06Q 20/3255* (2013.01); *G06Q 20/382* (2013.01); *G06Q 20/385* (2013.01); *G06Q 20/40* (2013.01); *G06Q 20/425* (2013.01)

(58) Field of Classification Search
USPC .................................. 235/375, 379, 380, 382
See application file for complete search history.

(56) References Cited

U.S. PATENT DOCUMENTS

| | | |
|---|---|---|
| 5,336,870 A | 8/1994 | Hughes et al. |
| 5,365,586 A | 11/1994 | Indeck et al. |
| | (Continued) | |

FOREIGN PATENT DOCUMENTS

| | | |
|---|---|---|
| EP | 1168265 | 1/2002 |
| EP | 2098985 | 9/2009 |
| | (Continued) | |

OTHER PUBLICATIONS

Security Concerns Usher in "Disposable" Credit Cards, Credit Card News, Sep. 15, 2000, 1 page.
(Continued)

*Primary Examiner* — Daniel Hess
(74) *Attorney, Agent, or Firm* — Kilpatrick Townsend & Stockton LLP

(57) ABSTRACT

Disclosed are apparatuses, systems, and methods pertaining to the secure communication of payment information from portable consumer devices, such as credit cards, to online merchants using verification tokens.

19 Claims, 6 Drawing Sheets

Related U.S. Application Data continuation-in-part of application No. 12/780,657, filed on May 14, 2010, now Pat. No. 9,038,886, said application No. 12/878,947 is a continuation-in-part of application No. 12/712,148, filed on Feb. 24, 2010, now Pat. No. 7,891,560.

(60) Provisional application No. 61/241,367, filed on Sep. 10, 2009, provisional application No. 61/178,636, filed on May 15, 2009.

(51) Int. Cl.
G06Q 20/38 (2012.01)
G06Q 20/42 (2012.01)

(56) References Cited

U.S. PATENT DOCUMENTS

| | | |
|---|---|---|
| 5,450,537 A | 9/1995 | Hirai et al. |
| 5,550,561 A | 8/1996 | Ziarno |
| 5,613,012 A | 3/1997 | Hoffman |
| 5,625,669 A | 4/1997 | McGregor et al. |
| 5,640,577 A | 6/1997 | Scharmer |
| 5,696,824 A | 12/1997 | Walsh |
| 5,729,591 A | 3/1998 | Bailey |
| 5,742,845 A | 4/1998 | Wagner |
| 5,781,438 A | 7/1998 | Lee |
| 5,794,259 A | 8/1998 | Kikinis |
| 5,883,810 A | 3/1999 | Franklin |
| 5,953,710 A | 9/1999 | Fleming |
| 5,956,699 A | 9/1999 | Wong |
| 5,974,430 A | 10/1999 | Mutschler, III et al. |
| 6,000,832 A | 12/1999 | Franklin |
| 6,014,635 A | 1/2000 | Harris |
| 6,032,859 A | 3/2000 | Muehlberger et al. |
| 6,044,349 A | 3/2000 | Tolopka et al. |
| 6,044,360 A | 3/2000 | Picciallo |
| 6,055,592 A | 4/2000 | Smith |
| 6,067,621 A | 5/2000 | Yu et al. |
| 6,163,771 A | 12/2000 | Walker |
| 6,227,447 B1 | 5/2001 | Campisano |
| 6,234,389 B1 | 5/2001 | Valliani et al. |
| 6,236,981 B1 | 5/2001 | Hill |
| 6,253,328 B1 | 6/2001 | Smith |
| 6,267,292 B1 | 7/2001 | Walker |
| 6,299,062 B1 | 10/2001 | Hwang |
| 6,327,578 B1 | 12/2001 | Linehan |
| 6,341,724 B2 | 1/2002 | Campisano |
| 6,354,496 B1 | 3/2002 | Murphy et al. |
| 6,385,596 B1 | 5/2002 | Wiser |
| 6,421,729 B1 | 7/2002 | Paltenghe et al. |
| 6,422,462 B1 | 7/2002 | Cohen |
| 6,425,523 B1 | 7/2002 | ShemUr |
| 6,449,347 B1 | 9/2002 | Ple et al. |
| 6,490,601 B1 | 12/2002 | Markus et al. |
| 6,499,042 B1 | 12/2002 | Markus |
| 6,560,709 B1 | 5/2003 | Galovich |
| 6,571,339 B1 | 5/2003 | Danneels et al. |
| 6,592,044 B1 | 7/2003 | Wong |
| 6,636,833 B1 | 10/2003 | Flitcroft |
| 6,738,749 B1 | 5/2004 | Chasko |
| 6,748,367 B1 | 6/2004 | Lee |
| 6,805,287 B2 | 10/2004 | Bishop |
| 6,850,996 B2 | 2/2005 | Wagner |
| 6,873,974 B1 | 3/2005 | Schutzer |
| 6,879,965 B2 | 4/2005 | Fung |
| 6,891,953 B1 | 5/2005 | DeMello |
| 6,901,387 B2 | 5/2005 | Wells |
| 6,907,476 B2 | 6/2005 | Wagner |
| 6,931,382 B2 | 8/2005 | Laage |
| 6,938,019 B1 | 8/2005 | Uzo |
| 6,941,285 B2 | 9/2005 | Sarcanin |
| 6,947,908 B1 | 9/2005 | Slater |
| 6,980,670 B1 | 12/2005 | Hoffman |
| 6,983,882 B2 | 1/2006 | Cassone |
| 6,990,470 B2 | 1/2006 | Hogan |
| 6,991,157 B2 | 1/2006 | Bishop |
| 6,993,658 B1 | 1/2006 | Engberg |
| 7,051,929 B2 | 5/2006 | Li |
| 7,062,706 B2 | 6/2006 | Maxwell et al. |
| 7,069,249 B2 | 6/2006 | Stolfo |
| 7,080,048 B1 | 7/2006 | Sines et al. |
| 7,103,576 B2 | 9/2006 | Mann, III |
| 7,111,324 B2 | 9/2006 | Elteto et al. |
| 7,113,930 B2 | 9/2006 | Eccles |
| 7,136,835 B1 | 11/2006 | Flitcroft |
| 7,159,180 B2 | 1/2007 | Ward |
| 7,177,835 B1 | 2/2007 | Walker |
| 7,177,848 B2 | 2/2007 | Hogan |
| 7,194,437 B1 | 3/2007 | Britto |
| 7,210,169 B2 | 4/2007 | Smith et al. |
| 7,216,292 B1 | 5/2007 | Snapper et al. |
| 7,231,045 B1 | 6/2007 | Parrott |
| 7,254,560 B2 | 8/2007 | Singhal |
| 7,254,569 B2 | 8/2007 | Goodman et al. |
| 7,257,581 B1 | 8/2007 | Steele et al. |
| 7,264,154 B2 | 9/2007 | Harris |
| 7,275,263 B2 | 9/2007 | Bajikar et al. |
| 7,275,685 B2 | 10/2007 | Gray et al. |
| 7,287,692 B1 | 10/2007 | Patel |
| 7,292,999 B2 | 11/2007 | Hobson |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,350,230 B2 | 3/2008 | Forrest |
| 7,353,382 B2 | 4/2008 | Labrou |
| 7,356,706 B2 | 4/2008 | Scheurich |
| 7,366,703 B2 | 4/2008 | Gray et al. |
| 7,379,919 B2 | 5/2008 | Hogan et al. |
| RE40,444 E | 7/2008 | Linehan |
| 7,412,420 B2 | 8/2008 | Holdsworth |
| 7,412,422 B2 | 8/2008 | Shiloh |
| 7,415,443 B2 | 8/2008 | Hobson et al. |
| 7,427,033 B1 | 9/2008 | Roskind |
| 7,430,540 B1 | 9/2008 | Asani |
| 7,431,202 B1 | 10/2008 | Meador et al. |
| 7,437,575 B2 | 10/2008 | Dennis et al. |
| 7,437,757 B2 | 10/2008 | Holdsworth |
| 7,444,676 B1 | 10/2008 | Asghari-Kamrani |
| 7,469,151 B2 | 12/2008 | Khan |
| 7,483,845 B2 | 1/2009 | Vetelainen |
| 7,512,975 B2 | 3/2009 | Aissi |
| 7,533,063 B2 | 5/2009 | Kianian |
| 7,533,828 B2 | 5/2009 | Ong |
| 7,543,738 B1 | 6/2009 | Saunders et al. |
| 7,548,889 B2 | 6/2009 | Bhambri |
| 7,567,934 B2 | 7/2009 | Flitcroft |
| 7,567,936 B1 | 7/2009 | Peckover |
| 7,568,631 B2 | 8/2009 | Gibbs et al. |
| 7,571,139 B1 | 8/2009 | Giordano |
| 7,571,142 B1 | 8/2009 | Flitcroft |
| 7,580,898 B2 | 8/2009 | Brown et al. |
| 7,584,153 B2 | 9/2009 | Brown et al. |
| 7,593,896 B1 | 9/2009 | Flitcroft |
| 7,599,863 B2 | 10/2009 | Sines et al. |
| 7,606,560 B2 | 10/2009 | Labrou |
| 7,627,531 B2 | 12/2009 | Breck et al. |
| 7,627,895 B2 | 12/2009 | Gifford |
| 7,650,314 B1 | 1/2010 | Saunders |
| 7,660,779 B2 | 2/2010 | Goodman et al. |
| 7,664,699 B1 | 2/2010 | Powell |
| 7,685,037 B2 | 3/2010 | Reiners |
| 7,694,130 B1 | 4/2010 | Martinez |
| 7,702,578 B2 | 4/2010 | Fung |
| 7,707,120 B2 | 4/2010 | Dominguez |
| 7,712,655 B2 | 5/2010 | Wong |
| 7,716,596 B2 | 5/2010 | Cao et al. |
| 7,734,527 B2 | 6/2010 | Uzo |
| 7,753,265 B2 | 7/2010 | Harris |
| 7,761,374 B2 | 7/2010 | Sahota et al. |
| 7,770,789 B2 | 8/2010 | Oder, II |
| 7,784,685 B1 | 8/2010 | Hopkins, III |

(56) References Cited

U.S. PATENT DOCUMENTS

| | | |
|---|---|---|
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,560 B2 | 2/2011 | Hammad |
| 7,891,563 B2 | 2/2011 | Oder, II |
| 7,896,238 B2 | 3/2011 | Fein |
| 7,922,082 B2 | 4/2011 | Mcato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,966,257 B2 | 6/2011 | DiGioacchino |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,328,095 B2 | 12/2012 | Oder, II |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,478 B2 | 8/2013 | Saunders |
| 8,510,816 B2 | 8/2013 | Quach |
| 8,533,860 B1 | 9/2013 | Grecia |
| 8,534,564 B2 | 9/2013 | Hammad |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,887,308 B2 | 11/2014 | Grecia |
| 8,893,967 B2 * | 11/2014 | Hammad ............... G06F 21/34 235/380 |
| 2001/0029485 A1 | 10/2001 | Brody |
| 2001/0032182 A1 | 10/2001 | Kumar et al. |
| 2001/0032192 A1 | 10/2001 | Putta et al. |
| 2001/0034720 A1 | 10/2001 | Armes |
| 2001/0042785 A1 | 11/2001 | Walker et al. |
| 2001/0051924 A1 | 12/2001 | Uberti |
| 2001/0054003 A1 | 12/2001 | Chien |
| 2001/0054148 A1 | 12/2001 | Hoornaert et al. |
| 2002/0007320 A1 | 1/2002 | Hogan |
| 2002/0016749 A1 | 2/2002 | Borecki |
| 2002/0023054 A1 | 2/2002 | Gillespie |
| 2002/0029193 A1 | 3/2002 | Ranjan |
| 2002/0035539 A1 | 3/2002 | O'Connell |
| 2002/0035548 A1 | 3/2002 | Hogan |
| 2002/0038286 A1 | 3/2002 | Koren et al. |
| 2002/0059146 A1 | 5/2002 | Keech |
| 2002/0073045 A1 | 6/2002 | Rubin |
| 2002/0077837 A1 | 6/2002 | Krueger et al. |
| 2002/0091877 A1 | 7/2002 | Karidis |
| 2002/0107791 A1 | 8/2002 | Nobrega et al. |
| 2002/0116341 A1 | 8/2002 | Hogan |
| 2002/0128977 A1 | 9/2002 | Nambiar et al. |
| 2002/0133467 A1 | 9/2002 | Hobson |
| 2002/0147913 A1 | 10/2002 | Lun Yip |
| 2002/0170960 A1 | 11/2002 | Ehrensvard et al. |
| 2003/0028481 A1 | 2/2003 | Flitcroft |
| 2003/0038835 A1 | 2/2003 | DeFelice |
| 2003/0057219 A1 | 3/2003 | Risolia |
| 2003/0097561 A1 | 5/2003 | Wheeler |
| 2003/0115142 A1 | 6/2003 | Brickell et al. |
| 2003/0126094 A1 | 7/2003 | Fisher |
| 2003/0130955 A1 | 7/2003 | Hawthorne |
| 2003/0142855 A1 | 7/2003 | Kuo et al. |
| 2003/0191709 A1 | 10/2003 | Elston et al. |
| 2003/0191945 A1 | 10/2003 | Keech |
| 2004/0010462 A1 | 1/2004 | Moon |
| 2004/0050928 A1 | 3/2004 | Bishop |
| 2004/0058705 A1 | 3/2004 | Morgan |
| 2004/0059682 A1 | 3/2004 | Hasumi |
| 2004/0093281 A1 | 5/2004 | Silverstein |
| 2004/0104268 A1 | 6/2004 | Bailey |
| 2004/0127256 A1 | 7/2004 | Goldthwaite |
| 2004/0139008 A1 | 7/2004 | Mascavage |
| 2004/0143532 A1 | 7/2004 | Lee |
| 2004/0158532 A1 | 8/2004 | Breck |
| 2004/0188519 A1 | 9/2004 | Cassone |
| 2004/0210449 A1 | 10/2004 | Breck |
| 2004/0210498 A1 | 10/2004 | Freund |
| 2004/0210821 A1 | 10/2004 | Kasser |
| 2004/0226999 A1 | 11/2004 | Ruat |
| 2004/0232225 A1 | 11/2004 | Bishop |
| 2004/0248554 A1 | 12/2004 | Khan et al. |
| 2004/0254890 A1 | 12/2004 | Sancho et al. |

(56) References Cited

U.S. PATENT DOCUMENTS

| | | |
|---|---|---|
| 2004/0260646 A1 | 12/2004 | Berardi |
| 2004/0267672 A1 | 12/2004 | Gray et al. |
| 2005/0037735 A1 | 2/2005 | Coutts |
| 2005/0043997 A1 | 2/2005 | Sahota et al. |
| 2005/0065875 A1 | 3/2005 | Beard |
| 2005/0077349 A1 | 4/2005 | Bonalle et al. |
| 2005/0080730 A1 | 4/2005 | Sorrentino |
| 2005/0108178 A1 | 5/2005 | York |
| 2005/0108569 A1 | 5/2005 | Bantz et al. |
| 2005/0109838 A1 | 5/2005 | Linlor |
| 2005/0127164 A1 | 6/2005 | Wankmueller |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2005/0278461 A1 | 12/2005 | Ohta |
| 2006/0016879 A1 | 1/2006 | Kean |
| 2006/0026098 A1 | 2/2006 | Peckover et al. |
| 2006/0131390 A1 | 6/2006 | Kim |
| 2006/0142058 A1 | 6/2006 | Elias |
| 2006/0168653 A1 | 7/2006 | Contrera |
| 2006/0175396 A1 | 8/2006 | Call et al. |
| 2006/0235795 A1 | 10/2006 | Johnson |
| 2006/0237528 A1 | 10/2006 | Bishop |
| 2006/0253389 A1 | 11/2006 | Hagale |
| 2006/0278704 A1 | 12/2006 | Saunders |
| 2006/0294023 A1 | 12/2006 | Lu |
| 2007/0005685 A1 | 1/2007 | Chau et al. |
| 2007/0083444 A1 | 4/2007 | Matthews et al. |
| 2007/0107044 A1 | 5/2007 | Yuen |
| 2007/0114274 A1 | 5/2007 | Gibbs |
| 2007/0129955 A1 | 6/2007 | Dalmia |
| 2007/0136193 A1 | 6/2007 | Starr |
| 2007/0136211 A1 | 6/2007 | Brown et al. |
| 2007/0170247 A1 | 7/2007 | Friedman |
| 2007/0178883 A1 | 8/2007 | Nandagopal |
| 2007/0179885 A1 | 8/2007 | Bird |
| 2007/0185820 A1 | 8/2007 | Talker |
| 2007/0185821 A1 | 8/2007 | Wells |
| 2007/0208671 A1 | 9/2007 | Brown |
| 2007/0228148 A1 | 10/2007 | Rable |
| 2007/0245414 A1 | 10/2007 | Chan |
| 2007/0272743 A1 | 11/2007 | Christie et al. |
| 2007/0284433 A1 | 12/2007 | Domenica et al. |
| 2007/0284443 A1 | 12/2007 | Anson et al. |
| 2007/0288377 A1 | 12/2007 | Shaked |
| 2007/0290034 A1 | 12/2007 | Routhenstein |
| 2007/0291995 A1 | 12/2007 | Rivera |
| 2008/0001744 A1 | 1/2008 | Batra et al. |
| 2008/0014867 A1 | 1/2008 | Finn |
| 2008/0015988 A1 | 1/2008 | Brown |
| 2008/0029607 A1 | 2/2008 | Mullen |
| 2008/0034221 A1 | 2/2008 | Hammad |
| 2008/0035738 A1 | 2/2008 | Mullen |
| 2008/0040276 A1 | 2/2008 | Hammad |
| 2008/0040285 A1 | 2/2008 | Wankmueller |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0071681 A1 | 3/2008 | Khalid |
| 2008/0097925 A1 | 4/2008 | King |
| 2008/0110983 A1 | 5/2008 | Ashfield |
| 2008/0154770 A1 | 6/2008 | Rutherford et al. |
| 2008/0162312 A1 | 7/2008 | Sklovsky et al. |
| 2008/0177796 A1 | 7/2008 | Eldering |
| 2008/0201264 A1 | 8/2008 | Brown |
| 2008/0201265 A1 | 8/2008 | Hewton |
| 2008/0228646 A1 | 9/2008 | Myers |
| 2008/0228653 A1 | 9/2008 | Holdsworth |
| 2008/0243702 A1 | 10/2008 | Hart |
| 2008/0245855 A1 | 10/2008 | Fein |
| 2008/0245861 A1 | 10/2008 | Fein |
| 2008/0275779 A1 | 11/2008 | Lakshminarayanan |
| 2008/0283591 A1 | 11/2008 | Oder, II |
| 2008/0289022 A1 | 11/2008 | Chiu |
| 2008/0302869 A1 | 12/2008 | Mullen |
| 2008/0302876 A1 | 12/2008 | Mullen |
| 2008/0306876 A1 | 12/2008 | Horvath et al. |
| 2008/0313264 A1 | 12/2008 | Pestoni |
| 2008/0319905 A1 | 12/2008 | Carlson |
| 2009/0006262 A1 | 1/2009 | Brown |
| 2009/0006646 A1 | 1/2009 | Duarte |
| 2009/0010488 A1 | 1/2009 | Matsuoka |
| 2009/0018959 A1 | 1/2009 | Doran et al. |
| 2009/0037333 A1 | 2/2009 | Flitcroft |
| 2009/0037388 A1 | 2/2009 | Cooper |
| 2009/0043702 A1 | 2/2009 | Bennett |
| 2009/0044268 A1 | 2/2009 | Tak |
| 2009/0048971 A1 | 2/2009 | Hathaway |
| 2009/0104888 A1 | 4/2009 | Cox |
| 2009/0106112 A1 | 4/2009 | Dalmia |
| 2009/0106138 A1 | 4/2009 | Smith et al. |
| 2009/0106160 A1 | 4/2009 | Skowronek |
| 2009/0125446 A1 | 5/2009 | Saunders |
| 2009/0132413 A1 | 5/2009 | Engelbrecht |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0219430 A1 | 9/2009 | Okamoto et al. |
| 2009/0248583 A1 | 10/2009 | Chhabra |
| 2009/0249462 A1 | 10/2009 | Chhabra |
| 2009/0254498 A1 | 10/2009 | Gupta et al. |
| 2009/0255987 A1 | 10/2009 | Olivares |
| 2009/0265260 A1 | 10/2009 | Aabye et al. |
| 2009/0276347 A1 | 11/2009 | Kargman |
| 2009/0289110 A1 | 11/2009 | Regen et al. |
| 2009/0292631 A1 | 11/2009 | Wells et al. |
| 2009/0294527 A1 | 12/2009 | Brabson |
| 2009/0307139 A1 | 12/2009 | Mardikar |
| 2009/0307493 A1 | 12/2009 | Smith |
| 2009/0308921 A1 | 12/2009 | Mullen |
| 2009/0313168 A1 | 12/2009 | Manessis |
| 2009/0319430 A1 | 12/2009 | Faith et al. |
| 2009/0319431 A1 | 12/2009 | Aiello |
| 2009/0319784 A1 | 12/2009 | Faith et al. |
| 2009/0327131 A1 | 12/2009 | Beenau |
| 2010/0008535 A1 | 1/2010 | Abulafia |
| 2010/0023400 A1 | 1/2010 | Dewitt |
| 2010/0088237 A1 | 4/2010 | Wankmueller |
| 2010/0094755 A1 | 4/2010 | Kloster |
| 2010/0100481 A1 | 4/2010 | Doran et al. |
| 2010/0106644 A1 | 4/2010 | Annan |
| 2010/0114776 A1 | 5/2010 | Weller et al. |
| 2010/0120408 A1 | 5/2010 | Beenau |
| 2010/0125516 A1 | 5/2010 | Wankmueller et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0174556 A1 | 7/2010 | Wilkins et al. |
| 2010/0176935 A1 | 7/2010 | Phillips |
| 2010/0185545 A1 | 7/2010 | Royyuru |
| 2010/0186073 A1 | 7/2010 | Curtis |
| 2010/0191613 A1 | 7/2010 | Raleigh |
| 2010/0211505 A1 | 8/2010 | Saunders |
| 2010/0223184 A1 | 9/2010 | Perlman |
| 2010/0223186 A1 | 9/2010 | Hogan |
| 2010/0228668 A1 | 9/2010 | Hogan |
| 2010/0235284 A1 | 9/2010 | Moore |
| 2010/0257102 A1 | 10/2010 | Perlman |
| 2010/0258620 A1 | 10/2010 | Torreyson |
| 2010/0274692 A1 | 10/2010 | Hammad |
| 2010/0274721 A1 | 10/2010 | Hammad |
| 2010/0291904 A1 | 11/2010 | Mfeldt |
| 2010/0293189 A1 | 11/2010 | Hammad |
| 2010/0293381 A1 | 11/2010 | Hammad |
| 2010/0293382 A1 | 11/2010 | Hammad |

(56) References Cited

U.S. PATENT DOCUMENTS

| | | |
|---|---|---|
| 2010/0306076 A1 | 12/2010 | Taveau |
| 2010/0318801 A1 | 12/2010 | Roberge et al. |
| 2010/0325041 A1 | 12/2010 | Berardi |
| 2010/0327054 A1 | 12/2010 | Hammad |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0140841 A1 | 6/2011 | Bona |
| 2011/0153437 A1 | 6/2011 | Archer |
| 2011/0153498 A1 | 6/2011 | Makhotin et al. |
| 2011/0154466 A1 | 6/2011 | Harper |
| 2011/0154467 A1 | 6/2011 | Bomar et al. |
| 2011/0161233 A1 | 6/2011 | Tieken |
| 2011/0184867 A1 | 7/2011 | Varadarajan |
| 2011/0191244 A1 | 8/2011 | Dai |
| 2011/0238511 A1 | 9/2011 | Park |
| 2011/0238573 A1 | 9/2011 | Varadarajan |
| 2011/0238579 A1 | 9/2011 | Coppinger |
| 2011/0246317 A1 | 10/2011 | Coppinger |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276418 A1 | 11/2011 | Velani |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2011/0307710 A1 | 12/2011 | McGuire et al. |
| 2012/0024946 A1 | 2/2012 | Tullis et al. |
| 2012/0028609 A1 | 2/2012 | Hrka |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0019098 A1 | 1/2013 | Gupta |
| 2013/0054337 A1 | 2/2013 | Brendell |
| 2013/0054466 A1 | 2/2013 | Mcato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212666 A1 | 8/2013 | Mattsson |
| 2013/0218698 A1 | 8/2013 | Moon |
| 2013/0226813 A1 | 8/2013 | Voltz |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |

(56) References Cited

U.S. PATENT DOCUMENTS

| | | |
|---|---|---|
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0052532 A1 | 2/2014 | Tsai |
| 2014/0052620 A1 | 2/2014 | Rogers |
| 2014/0052637 A1 | 2/2014 | Jooste |
| 2014/0061302 A1 | 3/2014 | Hammad |
| 2014/0110477 A1 | 4/2014 | Hammad |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0317625 A1 | 11/2015 | Hammad |

FOREIGN PATENT DOCUMENTS

| | | |
|---|---|---|
| EP | 2156397 | 2/2010 |
| GB | 2459850 | 11/2009 |
| JP | 2008-210370 | 9/2008 |
| KR | 10-2000-0054496 | 9/2000 |
| KR | 10-2003-0020189 A | 3/2003 |
| KR | 10-2005-0019674 | 3/2005 |
| KR | 10-2006-0022304 A | 3/2006 |
| KR | 10-2006-0096821 | 9/2006 |
| KR | 10-2006-0111200 A | 10/2006 |
| KR | 10-2007-0100076 | 10/2007 |
| KR | 10-2008-0026802 | 3/2008 |
| KR | 10-2008-0039330 | 5/2008 |
| KR | 10-2008-0051198 | 6/2008 |
| KR | 10-2009-0021388 | 3/2009 |
| KR | 10-2009-0044619 | 5/2009 |
| KR | 10-2010-0110642 | 10/2010 |
| RU | 2252451 | 5/2005 |
| RU | 2331110 C2 | 8/2008 |
| WO | 01/16900 | 3/2001 |
| WO | 01/17296 A1 | 3/2001 |
| WO | 01/84509 A2 | 11/2001 |
| WO | 0188785 A1 | 11/2001 |
| WO | 02/01520 | 1/2002 |
| WO | 0135304 | 5/2002 |
| WO | 02/059727 | 8/2002 |
| WO | 03/047208 | 6/2003 |
| WO | 03075192 A1 | 9/2003 |
| WO | 2004042536 | 5/2004 |
| WO | 2005073931 A2 | 8/2005 |
| WO | 2005/109360 | 11/2005 |
| WO | 2006/099294 | 9/2006 |
| WO | 2006113834 | 10/2006 |
| WO | 2008/014554 | 2/2008 |
| WO | 2009/003030 A2 | 12/2008 |
| WO | 2009/025605 | 2/2009 |
| WO | 2009032523 | 3/2009 |
| WO | 2009/052634 | 4/2009 |
| WO | 2010078522 | 7/2010 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |

OTHER PUBLICATIONS

Office Action mailed Aug. 28, 2015 in U.S. Appl. No. 13/411,400, 19 pages.
Office Action mailed Mar. 2, 2015 in U.S. Appl. No. 13/411,400, 18 pages.
Gillick, Kevin, "Trusted Execution Environment (TEE) Guide,": GlobalPlatform [online], [retrieved on Apr. 1, 2015], retrieved from the Internet <URL: https://www.globalplatform.org/mediaguidetee.asp>, 4 pages.
European Examination Report mailed Feb. 4, 2014 in European Patent Application No. EP 10772579.8, 7 pages.
European Search Report mailed Dec. 17, 2013 in related EP Application No. EP 10816167.0, 3 pages.
U.S. Appl. No. 12/778,446, filed Oct. 29, 2009, Perlman, 59 pages.
U.S. Appl. No. 12/778,459, filed Oct. 29, 2009, Perlman, 58 pages.
U.S. Appl. No. 12/778,485, filed Oct. 29, 2009, Perlman et al., 60 pages.
U.S. Appl. No. 12/939,963, filed Nov. 4, 2010, Hammad et al., 105 pages.
U.S. Appl. No. 61/061,936, filed Jun. 16, 2008, Manessis, 12 pages.
U.S. Appl. No. 61/112,124, filed Nov. 6, 2008, Weller et al., 61 pages.
U.S. Appl. No. 61/178,636, filed May 15, 2009, Hammad, 58 pages.
U.S. Appl. No. 61/256,095, filed Oct. 29, 2009, Perlman, 40 pages.
U.S. Appl. No. 61/256,136, filed Oct. 29, 2009, Perlman, 64 pages.
U.S. Appl. No. 61/256,141, filed Oct. 29, 2009, Perlman, 38 pages.
U.S. Appl. No. 61/256,143, filed Oct. 29, 2009, Perlman et al., 29 pages.
U.S. Appl. No. 61/256,147, filed Oct. 29, 2009, Perlman, 41 pages.
U.S. Appl. No. 61/258,194, filed Nov. 4, 2009, Hammad, 147 pages.
The International Search Report for Application No. PCT/US2010/034960, dated Dec. 22, 2010, 5 pages.
The International Search Report for Application No. PCT/US2010/034960, dated Dec. 22, 2010, 8 pages.
International Search Report dated May 27, 2011 from International Patent Application No. PCT/US2010/055500.
The International Search Report and Written Opinion for Application No. PCT/US2010/048455, mailed May 30, 2011.
"2.4.2 How VISA Card Verification Values are Used," 2.4.2 "z/Os V1R3.0 ICSF Application Programmer's Guide" IBM Library Server, 1 page, .COPYRGT. Copyright IBM Corp. 1997, 2002, downloaded Mar. 27, 2012 from URL: http://publibz.boulder.ibm.com/cgi-bin/bookmgr.sub.--OS390/BOOKS/CSF-B4Z20/2.4.2?SHEL.
Reisinger, D., "PayPal offers SMS security key for mobile users," Nov. 24, 2008, pp. 1-3, .COPYRGT. Copyright CBS Interactive, downloaded Mar. 27, 2012 from URL: http://news.cnet/com/8301-17939.sub.--1209-10106410-2.html.
The International Search Report and Written Opinion for Application No. PCT/US2010/032825, dated Dec. 1, 2010.
Office Action mailed Jul. 10, 2014 in U.S. Appl. No. 13/411,400, 16 pages.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Office Action mailed Aug. 25, 2016 in U.S. Appl. No. 14/681,668, 13 pages.

* cited by examiner

SECURE COMMUNICATION OF PAYMENT INFORMATION TO MERCHANTS USING A VERIFICATION TOKEN

CROSS-REFERENCES TO RELATED APPLICATIONS

This application is a continuation application of U.S. patent application Ser. No. 12/878,947, filed Sep. 9, 2010, which claims priority to U.S. Provisional Patent Application No. 61/241,367, entitled "Secure Communication of Payment Information to Merchants Using a Verification Token," filed Sep. 10, 2009, the contents of both of which are hereby incorporated in their entirety by reference for all purposes.

Also, U.S. patent application Ser. No. 12/878,947 is a continuation-in-part of prior application Ser. No. 12/780,657, entitled "Verification of Portable Consumer Devices," filed May 14, 2010, and a continuation-in-part of prior application Ser. No. 12/712,148, entitled "Verification of Portable Consumer Devices," filed Feb. 24, 2010, the contents of both applications being hereby incorporated in their entirety by reference for all purposes. Both of said prior application Ser. Nos. 12/780,657 and 12/712,148 claim priority to U.S. Provisional Patent Application No. 61/178,636, entitled "Dynamic Data Authentication," filed May 15, 2009, the contents of which are all hereby incorporated in their entirety by reference for all purposes.

BACKGROUND

As methods and devices for engaging in financial transactions have increased, old problems such as fraud and counterfeiting persist.

One of the primary sources of fraud, which is prevalent in the credit card industry, is skimming. Skimming refers to the electronic copying of a card's magnetic stripe data to create counterfeit cards.

Skimming is predominantly a phenomenon afflicting magnetic stripe-based transactions. This is because the magnetic stripe, which is placed on the back of a transaction card and stores a variety of data on three separate tracks, is a passive medium. In other words, the digital content of the magnetic stripe can be perfectly copied, without any difference between the copy and the original.

One of the primary means by which skimming can be prevented is for the consumer to closely monitor the whereabouts of his transaction card. This may allow the consumer to prevent the card from being swiped through inappropriate devices. However, as contactless cards evolve, the classic skimming problem comes along with it. In fact, in a wireless environment the opportunity to skim magnetic stripe data is more prevalent. In a wireless environment, a potential skimmer need not physically possess the card to be skimmed nor have access to any of the physical equipment (e.g., POS terminal, communication lines, etc.) which is required for skimming in a wire-based environment. A skimmer can, without the knowledge of the consumer or merchant, intercept the wireless transaction and copy the data being transmitted from the card to POS terminal. Similar types of interceptions can occur for online purchases.

To address the above problems, a dCVV or a dynamic card verification value can be used. For example, various systems and methods for generating dCVV's are discussed in U.S. patent application Ser. No. 10/642,878 entitled "Method and System for Generating a Dynamic Verification Value" filed on Aug. 18, 2003, and in U.S. patent application Ser. No. 11/764,376 entitled "On-Line Payment Transactions" filed on Jan. 29, 2008. Both of these applications are incorporated herein by reference in their entirely for all purposes.

In addition to generating a dCVV, a dCVV can be more effective for preventing fraud when it is securely received by a consumer. However, securely receiving and using a dCVV cannot overly interfere with a consumer's experience conducting a transaction. A consumer might not use the dCVV or a consumer might conduct fewer transactions if the inconvenience of receiving and using a dCVV is too great.

Embodiments of the invention are directed to addressing the above problems, and other problems, individually and collectively.

BRIEF SUMMARY

Disclosed are apparatuses, methods, and systems pertaining to the communication of payment information to online merchants and/or payment processing networks using verification tokens that read identification information from portable consumer devices.

One embodiment of the invention is directed to a verification token that reads identification information from a portable consumer device and securely provides the identification information to a validation entity. The exemplary verification token comprises a peripheral interface adapted to couple to a peripheral interface of a computer, a reader adapted to read identification information from portable consumer devices, a computer-readable medium, a data processor electrically coupled to the token's peripheral interface, reader, and the computer-readable medium, and code embodied on the computer-readable medium that directs the data processor to perform various actions. In an exemplary implementation, the verification token comprises code that directs the data processor to communicate with a computer by way of the apparatus' peripheral interface and to access to a networking facility of the computer, code embodied on the computer-readable medium that directs the data processor to transmit at least a portion of identification information to the validation entity by way of the networking facility of the computer, the at least a portion of the identification information preferably being transmitted in encrypted form.

In some implementations of the above embodiment, the verification token also receives a uniform resource identifier (URID) to the validation entity from the portable consumer device, as read by the token's reader. The uniform resource identifier (URID) may comprise a conventional uniform resource locator (URL), an internet-protocol address (IP-address), or any other type of identifier that can identify an entity on a communications network. The validation entity receives the identification information from the verification token, and sends the identification information to a merchant. The validation entity may validate the identification information before sending the identification information to the merchant. The validation entity may be associated with, operated by, and/or owned by the merchant. Also in this implementation, the portable consumer device may be associated with the merchant, co-branded by the merchant and an issuing bank, and/or provided by the merchant. The merchant may correlate the identification information it receives from the validation entity with an online transaction being conducted at the merchant's website, and may use the identification information to process the online transaction.

In other implementations of the above embodiment, a portion of the account number of the portable consumer device is associated with a particular merchant, such as in the case of a co-branded credit card (e.g., co-branded between the merchant and an issuing bank). In these implementations, the validation entity can determine the merchant identity by comparing a selected portion of each account number it receives against a list numbers of known co-branded cards, and send the identification information to the merchant determined by the comparison action. The validation entity may validate the identification information before sending the identification information to the merchant, or it may leave that action to the merchant's website to perform.

In an implementation of a further embodiment to the above-described embodiment, the verification token comprises a uniform resource identifier (URID) to the validation entity, or receives such a URID from the portable consumer device. The verification token further comprises code that directs the data processor to obtain an merchant identifier that identifiers a merchant, and sends the merchant identifier to the validation entity along with the at least a portion of the identification information read from the portable consumer device. The validation entity uses the merchant identifier to send the received identification information read from the portable consumer device to the merchant. The validation entity may validate the received identification information before sending it to the merchant. The validation entity may be associated with, operated by, and/or owned by a payment processing network, an issuing bank, or a third party. The merchant identification information may comprise a uniform resource identifier (URID) to the merchant.

Another embodiment of the invention is directed to a method comprising: establishing a communication link between a verification token and a computer, the computer having a networking facility, an Internet browser, and a display having a merchant web page of a merchant displayed thereon by the Internet browser; reading identification information from a portable consumer device into the verification token; transmitting, using the networking facility of the computer, at least a portion of the read identification information from the verification token to an entity that can provide at least a portion of the read identification information to the merchant.

Another embodiment of the invention is directed to a method comprising: coupling a verification token to a first computer using a peripheral interface of the first computer, the first computer having a networking facility and a display, the verification token comprising a peripheral interface adapted to couple to the peripheral interface of the first computer, a reader adapted to read identification information from portable consumer devices, a computer-readable medium, and a data processor, the verification token being configured to read identification information of a portable consumer device using the reader and to send at least a portion of the read identification information to a validation entity using the networking facility of the first computer; displaying a merchant web page on the first computer's display, the merchant web page being provided by a second computer; and presenting a portable consumer device to the reader of the verification token to send identification information contained in the portable consumer device to the merchant via the validation entity, wherein the validation entity is different from the first and second computers.

Another embodiment of the invention is directed to a computer program product embodied on a tangible computer-readable medium that can be used by a validation entity. The exemplary computer program product comprises: code embodied on the computer-readable medium that directs a data processor to communicate with a verification token over a communications network with a computer disposed between the verification token and the communications network, the verification token being coupled to the computer by way of a peripheral interface of the computer and configured to access a networking facility of the computer, the verification token being configured to read a portable consumer device for identification information, and to cause at least a portion of the identification information to be sent to the data processor using the networking facility of the computer; code embodied on the computer-readable medium that directs a data processor to receive identification information sent by the verification token; and code embodied on the computer-readable medium that directs a data processor to send data representative of at least a portion of the received identification information to a merchant computer.

Another embodiment of the invention is directed to a computer program product embodied on a tangible computer-readable medium that can be used by a validation entity. The exemplary computer program product comprises: code embodied on the computer-readable medium that directs a data processor to receive identification information of a portable consumer device read and sent by a verification token over a communications network with a computer disposed between the verification token and the communications network, the verification token being coupled to the computer by way of a peripheral interface of the computer and configured to access a networking facility of the computer; code that directs a data processor to apply at least one validation test on a piece of information sent by the verification token, the validation test producing a result of pass or fail; and code that directs a data processor to send, if the result of the at least one validation test is pass, data representative of at least a portion of the received identification information to a merchant computer.

Another embodiment of the invention is directed to a method that can be used by a validation entity. The exemplary method comprises: receiving, at a server, identification information of a portable consumer device read and sent by a verification token over a communications network with a computer disposed between the verification token and the communications network, the verification token being coupled to the computer by way of a peripheral interface of the computer and configured to access a networking facility of the computer; selecting a merchant to send at least a portion of the received identification information to; and sending, from the server, data representative of at least a portion of the received identification information to a computer of the selected merchant.

Another embodiment of the invention is directed to a computer program product embodied on a tangible computer-readable medium that can be used by a merchant computer system. The exemplary computer program product comprises: code embodied on the computer-readable medium that directs a data processor to present a website portal providing various web pages that enable a plurality of users to select at least one product or service for purchase, the code directing the data processor to create an active purchase session for each user that is actively pursuing a purchase; code embodied on the computer-readable medium that directs a data processor to receive messages from one or more validation entities, each validation message including data representative of at least a portion of the identification information of a portable consumer device; and code embodied on the computer-readable medium that directs a data processor to correlate the data received in a message from a validation entity to an active purchase session.

Another embodiment of the invention is directed to a merchant processing system. The exemplary system comprises a first component that communicates with a verification token over a communications network with a computer disposed between the verification token and the communications network, the verification token being coupled to the computer by way of a peripheral interface of the computer and configured to access a networking facility of the computer, the verification token being configured to read a portable consumer device for identification information, and to cause at least a portion of the identification information to be sent in encrypted form to the first component using the networking facility of the computer, the first component receives encrypted identification information sent by the verification token and decrypts the encrypted identification information. The system further comprises a second component that processes purchases from consumers over a communications network, and that receives data representative of decrypted identification information from the first component; the second component correlating the data received from the first component with a purchase that is it processing.

Another embodiment of the invention is directed to a method that can be used by a merchant computer system. The exemplary method comprises: presenting, from a server, a website portal providing various web pages that enable a plurality of users to select at least one product or service for purchase, the code directing the data processor to create an active purchase session for each user that is actively pursuing a purchase; receiving messages from one or more validation entities, each validation message including data representative of at least a portion of the identification information of a portable consumer device; and correlating the data received in a message from a validation entity to an active purchase session.

In each of the embodiments described above, and in each of the embodiments described below, the communications between the computer and the validation entity may be facilitated by, and/or conveyed through, a gateway (e.g., a proxy server, server entity, etc.) that is disposed between the computer and the validation entity. The gateway may act as an intermediary between a plurality of verification tokens and their associated computers on the one side, and a plurality of validation entities on the other side. The gateway may receive one or more initial communications from a verification token (via a computer in communication with the token), and may determine from information in the one or more initial communications an appropriate one of the validation entities to use to fulfill the token's request. For example, each verification token may be configured to operate with portable consumer devices issued by many different issuing banks or other such entities, and one or more of the validation entities may be configured to process requests from portable consumer devices issued by respective issuing banks or other such entities. The gateway may determine an appropriate one of validation entities to use based upon the identification information that the token read from a portable consumer device and sent to the gateway in an initial communication. In one implementation, the gateway redirects the token to the determined appropriate validation entity, with further communications occurring directly between the verification token and the appropriate validation entity. In another implementation, the communications between the verification token and the appropriate validation entity may be conveyed through the gateway (after the gateway has initially determined the identity of the appropriate validation entity based upon one or more initial communications with the token). This latter implementation may comprise relatively simple passing through of communications between the token and the appropriate validation entity with minimal processing by the gateway, or may comprise having the gateway virtually present itself as the appropriate validation entity to the verification token. Such virtual presentation may involve the gateway decrypting each message from the verification token, communicating with the appropriate validation entity to formulate a response to the token's message, and encrypting and sending a response message to the verification token. The gateway may also conduct one or more validation tests on behalf of the appropriate validation entity, particularly those related to validating the verification token. In this case, the gateway does not need to send to the appropriate validation entity those communications it receives from the token that pertain to validation tests that the gateway is handling. The gateway may be associated with, or operated by, a payment processing network.

Further details regarding embodiments of the invention are provided below in the Detailed Description with reference to the Figures. Further embodiments are also disclosed therein.

DETAILED DESCRIPTION

Embodiments disclosed herein pertain to the secure communication of identification information (e.g., payment information) of portable consumer devices to merchants. A portable consumer device comprises a device that holds identification information pertaining to an account held by a user with another entity, which is typically an entity that holds, extends, or credits items of value to the user (e.g., monetary funds, credits, debts, etc.). Portable consumer devices encompass credit cards, charge cards, debit cards, bank cards, prepaid cards, and other cards that identify an account held by a user with another entity. The cards are capable of existing in both passive forms (e.g., card with a magnetic stripe) and active forms (e.g., integrated circuit cards or smartcards), and further encompass portable electronic devices that, in whole or in part, function as such cards. Such portable electronic devices can include memory cards, account tokens, fobs, stickers, cellular telephones (including near-field communications phone), keychain devices (such as the Speedpass™ commercially available from Exxon-Mobil Corp.), personal digital assistants, transponders, smart media, pagers, and other mobile electronic devices.

Figure 7:
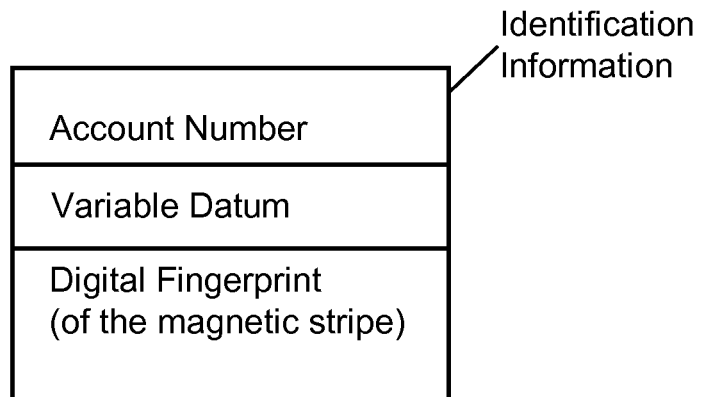
FIG. 7 illustrates an exemplary identification information that can be send by a verification token and used by a validation entity.

The identification information held by (e.g., embodied on) a consumer portable device comprises at least an account number, and preferably at least one of the following: a digital fingerprint of a magnetic stripe of the portable consumer device, or a variable datum that varies each time the portable consumer device is read for its identification information, as illustrated in FIG. 7. The magnetic stripe carries at least the account number of the device. The account number identifies the consumer account within at least one payment processing network, and may comprise a primary account number (PAN); it may also comprise alphanumeric characters. The digital fingerprint of the magnetic stripe is representative of the distribution of magnetic particles that form the magnetic stripe, and is generated by a specialized card reader that samples the distribution of magnetic particles when the card is swiped. The variable datum may comprise number characters, alphanumeric characters, or a cryptogram (e.g., cryptograph 17). The values of the variable datum vary in a way that is known to both the portable consumer device and an authorization entity, the latter of which may be an issuing bank or a payment processing network. The variable datum encompasses the dynamic CVV ("dCVV") and CVC3 card verification values generated by smartcards (both the contact and contactless forms), as well as cryptograms generated by many smartcards (e.g., cryptogram 17). The datum values may be pre-stored in a computer-readable medium of the device and in a computer-readable medium of the authorization entity, or may be generated by each of the device and the entity as needed (e.g., "generated on the fly") using a confidential algorithm known to the device and the entity or by a known algorithm that uses confidential keys or confidential information. The variable datum may comprise, or may be accompanied by, a counter value that indicates the number of times the portable consumer device has generated the variable datum; the counter value may assist the authorization entity in retrieving the variable datum from the entity's computer-readable medium, or in generating the variable datum from the algorithm. However, a counter value is not necessary, and the authorization entity may deduce the number of times the device has generated the variable datum from the history of authorization requests made for the device, or an algorithm that does not require a counter may be used.

The identification information may further comprise the name of the account holder (e.g., the user), the expiration date of the card, service codes, and discretionary data. As an example, the identification information may include the conventional "payment data" stored on the tracks of the magnetic stripe of a conventional credit card (e.g., Track 1, Track 2, and/or Track 3).

The identification information of a portable consumer device is read by a reader, which is an electrical component that can read the identification information from a portable consumer device and provide the identification information to another electrical component. A reader may comprise one or more of the following: a magnetic stripe reader (which may include fingerprint sampling circuitry), a card contact reader, and a contactless reader, the latter of which is commonly known as an RFID reader (RFID being an acronym for radio-frequency identification). A reader for reading fingerprints of magnetic stripes may include a security module that comprises a proprietary algorithm that generates a digital fingerprint from the sampled fingerprint data and that encrypts the digital fingerprint with a nonce word using an encryption key. Readers are predominantly found at point-of-sales locations of merchants.

A typical credit card transaction flow using a portable consumer device at a point-of-sales location is described next. The user's portable consumer device is provided to the user by or on behalf of an issuing bank. The issuing bank extends credit to the user, represents the user in credit card transactions, and pays merchants for the purchases made by the user. A user presents his or her portable consumer device to a merchant at a point-of-sales location to pay for an item or service. The merchant uses a reader to read the user's portable consumer device, and sends the identification information read from the device along with merchant's information and the transaction amount to an acquiring bank. The merchant may also read the portable consumer device for the printed card verification value (e.g., the CVV value printed on the backs of many credit cards), and may send this along as part of the transaction information sent to the acquiring bank. The acquiring bank represents, and vouches for, the merchant in credit card transactions. The acquiring bank forwards the transaction information to a payment processing network, such as VisaNet™, for authorization. A payment processing network generally encompasses a collection of one or more data processing server computers, subsystems, networks, and operations used to support and deliver one or more of the following: authorization services, exception file services, and clearing and settlement services. Payment processing networks encompass bank processing networks, credit-card payment processing network, etc. An exemplary payment processing network may include VisaNet™. Exemplary payment processing networks are able to process one or more of the following: credit-card transactions, debit-card transactions, and other types of commercial transactions. A payment processing network may use any suitable wired or wireless network, including the Internet, to communicate with acquiring banks and issuing banks.

Prior to the occurrence of a credit-card transaction, the payment processing network has established a protocol with each issuing bank on how the bank's transactions are to be authorized. In some cases, such as when the transaction amount is below a threshold value, the payment processing network will authorize the transaction based on information that it has about the user's account without consulting the issuing bank, and will accept the liability if the transaction turns out to be fraudulent. In other cases, such as when the transaction amount is above a threshold value, the payment processing network will forward the transaction information on to the issuing bank for verification and authorization. As part of the authorization process, the payment network or the issuing bank may verify the digital fingerprint or the varying datum provided by the portable consumer device. The digital fingerprint is stored at the issuing bank, and may be securely provided to the payment processing network by the issuing bank for storage and subsequent use. The algorithm for generating the varying datum is stored at the issuing bank, and may be securely provided to the payment processing network for storage and subsequent use. As also part of the authorization process, the payment network or the issuing bank may verify the printed card verification value (e.g., CVV), which is stored at the issuing bank, and may be securely provided by the issuing bank to the payment processing network for storage and subsequent use. The degree to which the payment processing network is involved in the verification of the consumer portable device and the authorization of the transaction is typically configured according to the wishes of the issuing bank. Once the transaction is authorized, the payment processing network sends an authorization indication to the acquiring bank, which sends the authorization indication on to the merchant. In order to reduce fraud, merchants are not allowed to store digital fingerprints, variable datum, and printed card verification values (CVVs) for more than 24 hours.

When a user wishes to make an online purchase with a merchant over the Internet, the user types in the credit card account number, cardholder name, expiration date, and the printed card verification value into respective fields on the merchant's checkout page. In this case, the card's magnetic fingerprint or the card's variable datum is not used in the transaction, and they are not available to the payment processing network or the issuing bank to aid in verifying that the card was actually present during the transaction. Accordingly, there is a greater risk of fraud with such online purchases. For example, a store clerk can copy down the account information and printed verification value during a transaction at a point-of-sales location, and can later use the copied information to make an online purchase. As another example, a hacker can install spyware on the user's computer to intercept the account information and printed verification value, and use it to make fraudulent purchases at other online merchants. Other avenues of potential fraud exist. Embodiments of the invention are directed to mitigating these types of fraudulent activity.

Figure 1:
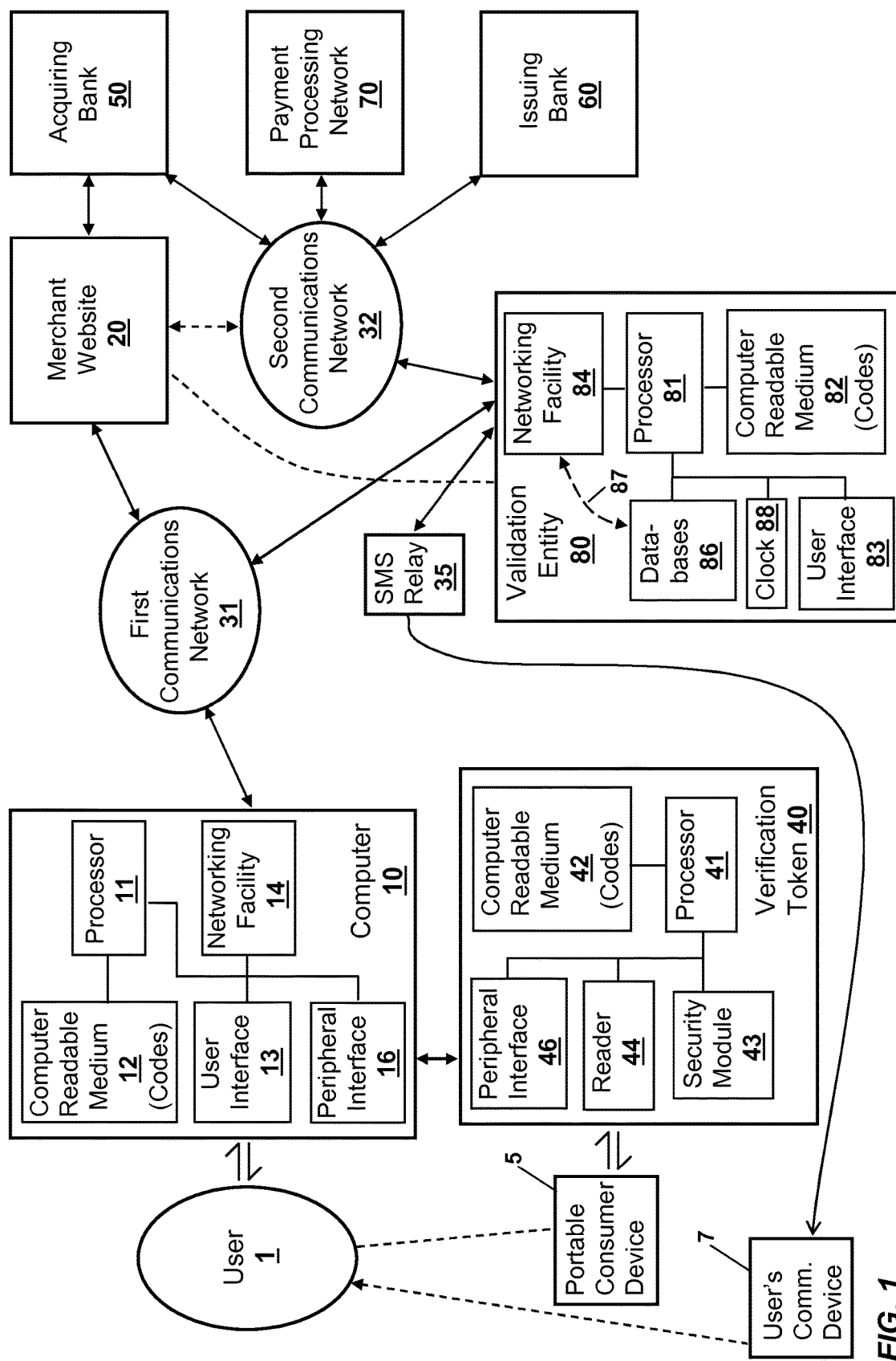
FIG. 1 illustrates some exemplary embodiments of the invention.

FIG. 1 illustrates some exemplary embodiments of the invention in the context of an online purchase. A general overview description of the embodiments and components shown in the figure will be given, followed by more detailed descriptions. Shown in the figure are icons for a user 1, the user's portable consumer device 5, the user's communication device 7 (such as a cell phone), the user's computer 10, the merchant's website 20, and a first communications network 31 that enables the user's computer and the merchant's website to communicate with one another. The first communications network 31 may include the Internet, a telecommunications network (e.g., a wireless network, cell phone network, a telephone network, a cable network, or any combination thereof), a wide area network (WAN), a local area network (LAN), a home router or gateway coupled to one of the above networks, or any combination of the above. Also shown in FIG. 1 is an acquiring bank 50 for the merchant, an issuing bank 60 for the portable consumer device 5, a payment processing network 70, and a second communications network 32 that enables the payment processing network 70 to communicate with each of the banks 50 and 60. The second communications network 32 may comprise the Internet (and therefore may overlap and share facilities with the first communications network 31), or may comprise one or more private networks, or combination of one or more private networks with the Internet. A private network may comprise a telecommunications network, a wide area network (WAN), a local area network (LAN), or any combination thereof. In some instances, the first and second communications networks 31 and 32 may be the same (such as a network using the Internet as the backbone). A communications network generally comprises a network of one or more communications links and two or more nodes that pass messages from one part of the network to another part. Each node comprises one or more pieces of electrical machinery, and each link may comprise one or more of the following: optical fibers, optical links, radio links, electrical wires. The components described so far are, for the most part, conventional and arranged in a conventional manner.

FIG. 1 illustrates a verification token 40 according to one embodiment of the invention, and a validation entity 80 according to another embodiment of the invention. These components, and the interactions between them and between other components shown in FIG. 1 are novel, and do not form part of the prior art. Verification token 40 has a reader 44 to read portable consumer device 5, and a peripheral interface 46 adapted to couple to a peripheral interface 16 of computer 10. Reader 46 may comprise one or more of the following: a magnetic stripe reader (which may include fingerprint sampling circuitry and security module), a card contact reader, and a contactless reader, the latter of which is commonly known as an RFID reader. Verification token 40 is configured to communicate to validation entity 80 by way of a networking facility 14 of computer 10. After user 1 fills a purchase cart on merchant website 20 (e.g., merchant computer), the user may bring up the merchant's checkout page to provide the user's payment information and commit to the purchase. At this point, user 1 presents his or her portable consumer device 5 to a card reader 44 of verification token 40 to provide the device's identification information (an example of which is illustrate in FIG. 7). The verification token 40 reads the identification information from the user's portable consumer device 5, and sends at least a portion of the identification information in a secure manner (e.g., in an encrypted form) to validation entity 80. Validation entity 80 preferably validates the identification information and/or validates the verification token 40 to ensure that the portable consumer device 5 was actually presented to verification token 40, and securely forwards the identification information on to a transaction processing entity, such as a computer of merchant's website 20, to be used in a purchase transaction if the identification information and/or token is validated. Validation entity 80 preferably applies one or more validation tests to verification token 40 and/or the identification information to obtain a level of confidence that the portable consumer device 5 was actually presented to verification token 40 to request the dCVV2 value. Validation entity 80 may have a stored record of the digital fingerprint of portable consumer device 5 or the algorithm for generating the variable datum of device 5, and can validate the received identification information by comparing the fingerprint or variable datum provided in the received information with that read or recreated from its stored record for device 5. In addition to this, or in place of this, validation entity 80 can validate the authenticity of verification token 40, and trust the information sent by verification token 40 until a fraudulent attempt or incident occurs. When the one or more validation tests are passed, and preferably with no tests being failed, validation entity 80 forwards the identification information on to a transaction processing entity, such as a merchant's website 20 (also called merchant computer 20, and merchant computer system 20).

In some implementations, validation entity 80 and merchant website 20 are part of a merchant system for a merchant that offers a co-branded credit card (e.g., co-branded portable consumer devices 5). This possibility is illustrated by the dashed line that connects validation entity 80 with merchant website 20. The merchant system may be owned and operated by the merchant, or owned by another party and operated on behalf of the merchant. In other implementations, entity 80 may determine the identity of the merchant from some of the digits of the account number provided in the identification information, where such digits are assigned to a merchant of a cobranded credit card. In yet other implementations, validation entity 80 receives information that identifies a merchant (the "merchant identification information" or "merchant identifier") from verification token 40 along with the identification information for device 5, and, if valid, securely forwards data representative of the identification information for device 5 on to the merchant identified by the merchant identification information. For this, the merchants may be screened and verified by validation entity 80 beforehand, and secure communication channels between entity 80 and the verified merchants may be established beforehand. Depending upon implementations, the data representative of the identification information sent to the merchant by entity 80 may comprise a portion or all of the received and verified identification information, or may comprise a substitute account number that the merchant is to use in place of the PAN, or a payment-processing transaction number, or a combination of the above (e.g., card holder name, substitute account number, and payment-processing transaction number). In each of the above implementations, user 1 does not need to input payment information into the merchant's checkout page. Instead, once merchant website 20 receives the data representative of the validated identification information from entity 80, the data may be entered on the checkout page by merchant website 20 and displayed to the user on user interface 13, with the account number and CVV value for device 5 being partially and/or fully masked with non-related characters, such as asterisks (e.g., "****"). Once the data is filled in, user 1 may commit to the purchase transaction and complete the transaction by clicking on a "Submit" button or "Continue" button of the checkout page. Validation entity 80 may also provide the user's shipping and/or billing address ("address information") to the merchant so that the user need not fill this information into the merchant's checkout page. Validation entity 80 may obtain the address information from verification token 40, from the issuing bank 60 for device 5, or from an account that user has set up with validation entity 80 (described below in greater detail).

Merchant website 20 may use a number of techniques to correlate the data representative of the validated identification information that it receives from validation entity 80 with the active purchasing sessions that it is processing. First, if validation entity 80 and merchant website 20 are part of a merchant system, merchant website 20 may have previously established a secure (e.g., password protected) merchant account for user 1, where the user has registered the account information for his or her portable consumer device 5. In this case, merchant website 20 may compare the incoming validated identification information from validation entity 80 with the account information of the active purchasing sessions that it is handling to find a match. In another case, the merchant website 20 may have asked user 1 to provide a portion of the identification information of device 5 on its checkout page, such as the last four or five digits of the account number and account holder's last name. Merchant website 20 can compare this partial amount of information against the incoming identification information from validation entity 80 to make the correlations.

After user 1 commits to the purchase transaction, merchant website 20 sends the data representative of the identification information, the purchase information, and the merchant information to acquiring bank 50, which in turn sends the data and information to payment processing network 70 for authorization. This is known as an authorization request, and the data and information that merchant website 20 sends is known as the transaction information (e.g., the collection of the data representative of the identification information, the purchase information, and the merchant information). The data representative of the validated identification information sent to merchant website 20 by validation entity 80 may include an CVC3 value or dCVV value, as described above. Merchant website 20 may include this value with the transaction information sent to network 70, and/or may include a printed CVV value with the transaction information, the printed CVV value being read from device 5 and entered on the merchant's checkout page by user 1 or token 40. Payment processing network 70 and issuing bank 60 can then perform the actions that they normally perform to authorize the transaction, such as checking whether the merchant 20 is in good standing, and checking the account limit of user 1 to ensure that there are sufficient funds to cover the purchase price of the transaction, and checking the CVC3, dVCC, or CVV values. In the transaction request that it sends, merchant 20 may provide an indication that the identification information was read by a verification token 40 and validated by validation entity 80, which gives payment processing network 70 and issuing bank 60 an extra degree of assurance that the user's portable consumer device 5 was present during the transaction. Instead, or in addition thereto, validation entity 80 may convey an indication to payment processing network 70 that it validated device 5's identification information for a transaction on merchant website 20.

In addition to helping ensure that portable consumer device 5 was actually present during the transaction between user 1 and merchant 20, the communication of the data representative of the identification information from verification token 40 to merchant 20 by way of validation entity 80 can be done in encrypted channels that are secure against a "man in the middle" attack that a fraudster may try on the user's computer 10. That is, even if the fraudster installs a "Trojan horse" program on the user's computer 10 that logs the user's key strokes one the computer's keyboard and sends them to the fraudster's computer, the identification information (e.g., credit card account number and card holder name) cannot be obtained by the Trojan horse program since the information is not typed into the merchant's web page by the user, but is instead securely sent to merchant 20 by validation entity 80.

As indicated above, the identification information read from portable consumer device 5 may include a cryptogram (e.g., cryptogram 17) generated by the device as the variable datum. In such cases where device 5 is adapted to generate and provide such a cryptogram, card reader 44 provides the user's device 5 with "dummy" transaction information that is known to both token 40 and validation entity 80. The dummy transaction information may include a static transaction amount and a static merchant name, depending upon the type of cryptogram to be generated. The dummy transaction information may be different for each token 40. The user's device 5 uses the transaction information to generate the cryptogram. The user's device typically has a counter value, often called the Application Transaction Counter (ATC), which is included in the cryptogram computation, and which is incremented with each transaction. The counter reduces the chances of a fraudster guessing the cryptogram value. In some cases, user's device 5 may need a PIN to activate the computation of the cryptogram. For this, token 40 may display a pop-up window on the user's computer 10 that requests the entry of a PIN by the user, and token 40 may provide the pin to the user's device 5 along with the request for the cryptogram.

In further implementations, validation entity 80 may obtain a dynamic device verification value for the portable consumer device 5 as part of validating the device's identification information. For the sake of clarity, and without loss of generality, this device verification value is referred to as a "dCVV2" value, so as to distinguish it from the following: (1) the "CVC3" or "dCVV" values generated by smartcards (described above), (2) the printed CVV values found on the backs of credit cards, and (3) the CVV field found on the merchant's checkout page. The dCVV2 value comprises a variable datum (e.g., a multi-digit number), and can be used to complete the purchase transaction. Validation entity 80 may obtain the dCVV2 value by generating it from pre-stored data, or by receiving it from payment processing network 70 or issuing bank 60 in response to a request for it. If it did not receive the dCCV2 value from processing network 70, validation entity 80 provides the dCVV2 value to payment processing network 70, along with the identification information of device 5 so that network 70 can correlate the dCVV2 value to the user's account. Validation entity 80 also provides the dCVV2 value to one or both of merchant 20 and verification token 20. If the dCVV2 value is provided to verification token 40, token 40 may fill in the CVV field found on the merchant's checkout page with the provided dCVV2 value, or may display the provided dCVV2 value to user 1 so that the user can fill in the CVV field with the dCVV2 value. If the dCVV2 value is provided to merchant 20, merchant 20 may fill in the CVV field on the merchant's own checkout page with the provided dCVV2 value, or may check it against the value entered on its checkout page by user 1 or token 40 to gain further assurance for itself that device 5 was present during the transaction. In either case, the dCVV2 value reaches both the merchant 20 and payment processing network 70. When user 1 authorization the transaction (such as by clicking the "Submit" button or "Continue" button on the merchant's checkout page), merchant 20 sends the dCVV2 value along with the user's payment information (e.g., the data representative of identification information of device 5), merchant information, and transaction information to network 70 (via its acquiring bank) as part of its authorization request for the transaction.

Next, payment processing network 70 can compare incoming authorization requests from merchants (such as forwarded by acquiring banks) against the information it receives from validation entity 80 (such as by looking at account numbers), and can match (e.g., correlate) incoming authorization requests with validation information and dCVV2 values previously sent to it by validation entity 80. If a match between the dCVV2 value provided in an authorization request and the dCVV2 value previously provided by entity 80 is found, then payment processing network 70 has a very high degree of assurance that consumer portable device 5 was present and in the possession of user 1 at the time the purchase transaction was made. This provides a greater degree of assurance in comparison to the reliance on CCV values printed on the backs of credit cards. Payment processing network 70 and issuing bank 60 can then undertake the other actions that they perform to authorize the transaction, such as those described above. In these implementations where dCVV2 values are used, payment processing network 70 does not need to validate the digital fingerprint and/or the variable datum of the portable consumer device 5, if those actions have been done by validation entity 80. (Payment processing network 70 may, however, perform those validate actions for merchant point-of-sales transactions.)

As a further feature, which is useful when multiple devices 5 have been allocated under one account number (e.g., multiple cards under one PAN for a household), the identification information that token 40 collects and provides to validation entity 80 may include a device identifier alone with the account number. This device identifier uniquely identifies one of the devices allocated under the account number. Provision entity 80 may further use the device identifier to obtain different dCVV2 values for the different devices allocated under the account number.

A first validation test that validation entity 80 may apply pertains to verifying that verification token 40 is authentic. For this, verification token 40 may send its serial number to validation entity 80, along with a message encrypted by an encryption key, with the message and encryption key being known to token 40 and entity 80 (but not the general public), and with the encryption key further being uniquely assigned to the token's serial number (uniquely assigned to the token). Validation entity 80 has a database of serial numbers and corresponding uniquely assigned encryption keys, and can validate that verification token 40 has sent the correct message for the serial number. Validation of the correct message serves to authenticate verification token 40. If the first validation test is failed, validation entity 80 may record the serial number of the failed token 40 and the source IP address from which the failed token 40 made the request in a database (such as a database 86 described below). A second validation test that validation entity 80 may apply pertains to verifying that verification token 40 has not been involved in fraudulent transactions. For this, validation entity 80 may also have a database that tracks the serial numbers of verification tokens that have been used in fraudulent activities, and may check the serial number of verification token 40 against this database. The second validation test may further comprise checking the token serial number and/or the IP address from which an incoming dCVV2 request was originated (the source IP address of the message) against the previously-described database that stores token serial numbers and IP addresses associated with requests that have failed the first validation test. If a token serial number or IP address is found in this database, the second validation test may be deemed to have been failed. Checking the token serial numbers and/or the IP addresses in this way prevents replay attacks by fraudsters. It may be appreciated that the database of serial numbers of tokens that failed the first validation test may be combined with the database of serial numbers of tokens involved in fraudulent activities. This combined database, as well as the two other databases, may be generically termed as a database of serial numbers of suspicious tokens. Additional validation tests are described below in greater detail.

Embodiments and components shown in FIG. 1 are now described in greater detail.

Computer 10.

The user's computer 10 may comprise a desktop computer, a laptop computer, or any portable electronic device that has a networking facility and a peripheral interface for communicating with one or more peripheral devices. Computer 10 has one or more processors 11, a tangible computer-readable medium 12 coupled to processor(s) 11 that stores instruction codes (software) that direct processor(s) 11 and that stores data used by processor(s) 11, and a user interface 13 coupled to processor(s) 11. Networking facility 14 and peripheral interface 16, which were previously described above, are also coupled to processor(s) 11, with networking facility 14 also being coupled to first communications network 31. User interface 13 comprises one or more video output devices (e.g., displays, screens) and one or more input devices (e.g., keyboard, mouse, trackball, etc.) for user 1 to receive information from computer 10 and to provide input to computer 10. Computer-readable medium 12 may comprise a combination of semiconductor memory and non-volatile storage, such as one or more disk drives and/or non-volatile memory. Computer-readable medium 12 stores an operating system for computer 10, which enables processes and applications to be run by processor(s) 11. The operating system provides services to these processes and applications, and enables these processes and applications to access components of user interface 13, portions of computer-readable medium 12, networking facility 14, peripheral interface 16, and other components of computer 10. The operating system may be complex and full featured, such as found on desk-top computers, or simplified, such as found on cell phones, PDAs, and many other types of portable electronic devices.

Networking facility 14 of computer 10 may comprise software and hardware that enable a process running on computer 10 to communicate with a communications network, such as network 31, to send and receive messages, data, and the like to one or more entities coupled to the communications network. The hardware of facility 14 may comprise dedicated hardware separate from processor(s) 11, or the shared use of processor(s) 11, or a combination thereof. The software of facility 14 may comprise firmware, software stored in computer-readable medium 12 or another computer-readable medium, portions of the operating system, or a combination of any of the preceding items. Networking facility 14 is preferably a non-exclusive resource, allowing access to the communications network by other processes and applications being run by computer 10. Peripheral interface 16 of computer 10 comprises a wired or wireless connection that enables a peripheral device (separate from computer 10) to communicate with the computer. Conventional wired connections include universal serial bus (USB) connectors ("USB ports"), serial ports, parallel ports, and PCMCIA ports. Conventional wireless connections include infra-red (IR) base stations and Bluetooth™ base stations that are built into computer 10 or that are coupled to a peripheral interface of computer 10.

Verification Token 40.

Figure 5:
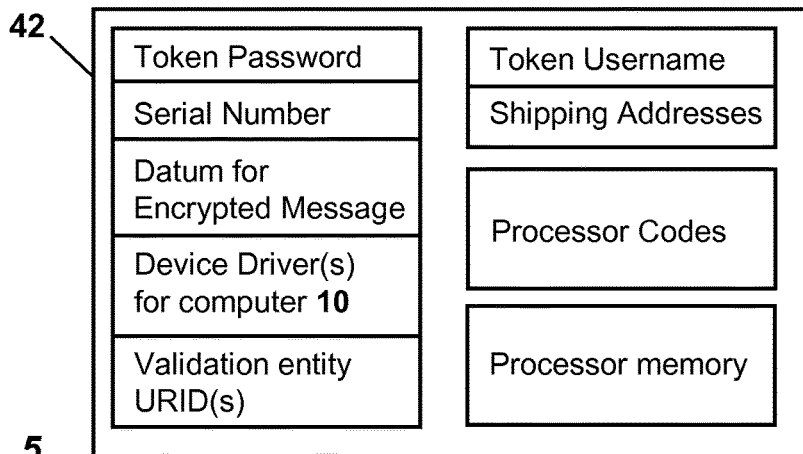
FIG. 5 illustrates an exemplary implementation of a computer-readable memory that can be used by a verification token.
Figure 6:
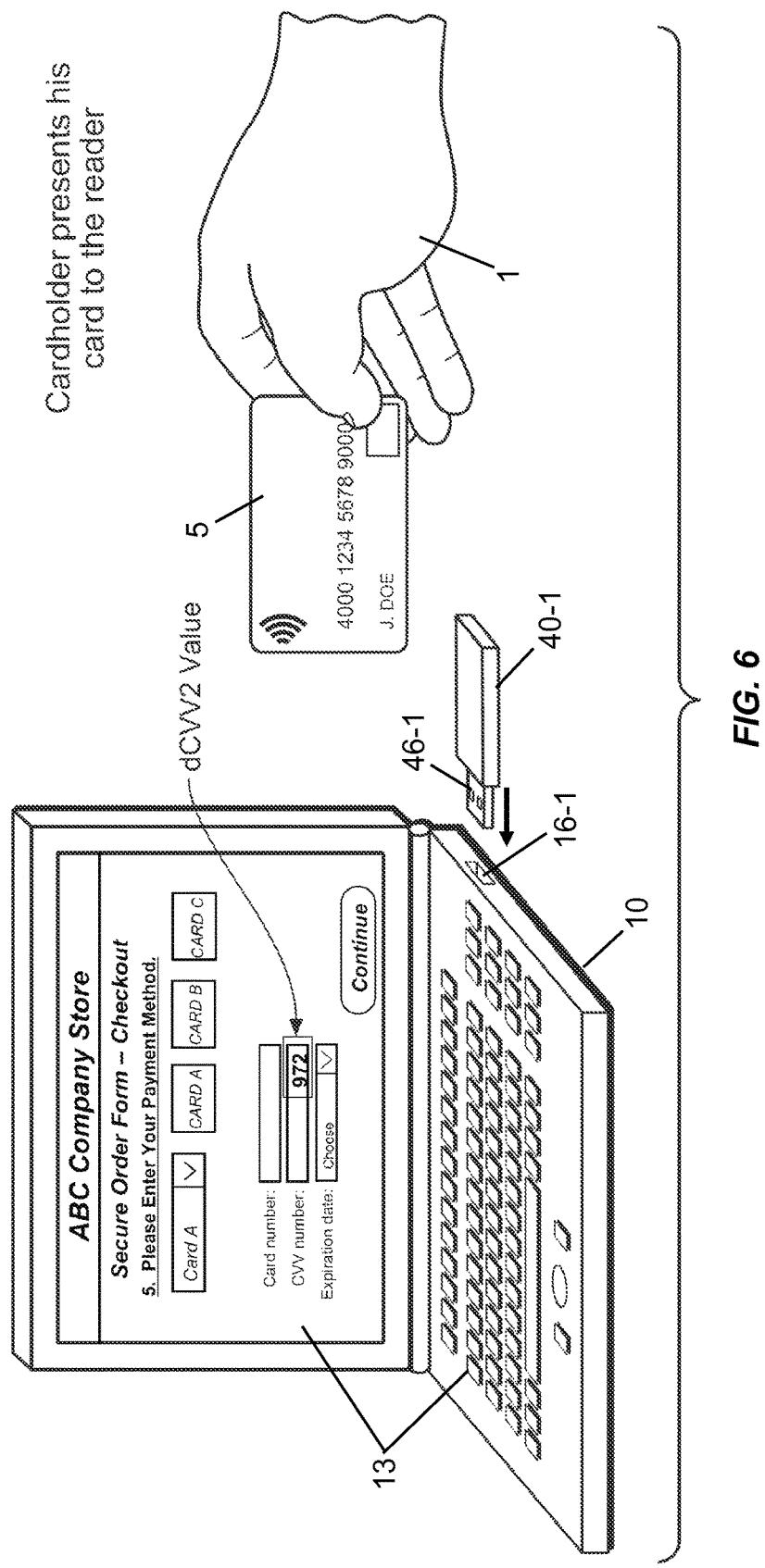
FIG. 6 illustrates an verification token and computer using USB connectors in the peripheral interfaces.

In addition to reader 44 and peripheral interface 46 (described above), verification token 40 further comprises a processor 41, a tangible computer-readable medium 42 coupled to processor 41 holding data and codes that direct the operation of processor 41, a security module 43 coupled to processor 41 and adapted to securely store one or more encryption keys and to encrypt and decrypt data for token 40, a reader 44 coupled to processor 41 and adapted to read portable consumer devices 5, and a peripheral interface 46 coupled to processor 41 and adapted to communicate to computer 10 by way of peripheral interface 16. Processor 41 may comprise a conventional microprocessor, and computer-readable medium 42 may comprise a combination of semiconductor memory and non-volatile storage, such non-volatile memory. FIG. 5 illustrates an exemplary implementation of computer-readable medium 42, which include the storage of several datum elements (described in greater detail below), processor codes that direct the operation of processor 41, and processor memory which processor 41 may use in carrying out its tasks. Referring back to FIG. 1, security module 43 may comprise encryption and decryption circuitry (which may include one or more processors), and may comprise one or more encryption keys stored in a secured memory. Security module 43 may also include firewall security circuitry that protects verification token 40 from attacks from hackers conducted through peripheral interface 16. Reader 44 may comprise a convention reader, as described above. Peripheral interface 46 may comprise a wired or wireless connection adapted to communicate with peripheral interface 16 of computer 10. As indicated above, conventional wired connections include universal serial bus connectors ("USB ports"), serial ports, parallel ports, and PCMCIA ports. Conventional wireless connections may include infrared and Bluetooth™ remote stations. When using a conventional wired connection with peripheral interface 46, verification token 40 may be detachably coupled to computer 10 at peripheral interface 16, such as at a USB port connector. FIG. 6 illustrates an exemplary verification token 40-1 with a USB port connector (male type) as part of its peripheral interface 46-1. Also illustrate in FIG. 6 is computer 10, its peripheral interface 16-1 having a USB port connector (female type) to which USB connector 46-1 is plugged into, the user interface 13 of computer (e.g., screen and keyboard), the user's portable consumer device 5 (RFID-type card), user 1, and the presentation of a dCVV2 value on user interface 13. Token 40 may further include a visual indicator, such as a light-emitting diode (LED), that it lights when it is ready to read a user's device 5, and may further include an audible indicator, such as a piezoelectric buzzer, that sounds when token 40 is finished with reading a user's device 5. The visual and audible indicators may be operated by the circuitry of reader 44. In other implementations, one or more of these indicators may be operated by processor 41 through I/O commands.

Referring back to FIG. 1, verification token 40 further comprises various codes embodied on computer-readable medium 42 that direct data processor 41 to perform respective actions (e.g., processor codes shown in FIG. 5). A first code directs data processor 41 to communicate with computer 10 by way of peripheral interface 46 so as to gain access networking facility 14 of computer 10. The first code may comprise code that directs data processor 41 to send a device driver to computer 10 and an instruction to install the device driver in the computer's operating system, wherein the device driver is a collection of instructions to be run by computer 10 that enables computer 10 to recognize the verification token and communicate with the verification token 40, and enables the token's data processor 41 to make function calls to various application program interfaces (API's) of the computer's operating system, such as those related to networking and accessing networking facility 14. So called "self-installing" drivers are known to the art, and can be used here. They comprise one or more function calls to an application programming interface (API) of the computer's operating system, such as the device manager's API. The first code may be configured to work with a selected operating system, such as Windows or Symbian OS, or may be configured to work with several operating systems. In the latter case, the first code may include several device drivers for the various operating systems, and instructions that query computer 10 for its operating system type and select (and install) the driver most appropriate for the computer's operating system. The device drivers may be stored in a section of computer-readable medium 42, as illustrated in the example of FIG. 5. The first code may further include, as an option, instructions that direct processor 41 to generate an I/O signal that causes the above-described visual indicator to be lit in response to processor 41 gaining access to networking facility 14 of computer 10.

Referring back to FIG. 1, a second code of verification token 40 directs data processor 41 to receive identification information read from portable consumer device 5 by the reader 44. The second code may include code that directs the data processor 41 to receive a universal resource identifier (URID) of a validation entity 80, as read from portable consumer device 5 by the reader 44. The second code may comprise instructions that direct processor 41 to contact reader 44 at periodic intervals through an I/O command to determine if the reader has any data for the processor, and to read the data when data is indicated as being present. The second code may further direct processor 41 to contact reader 44 through an I/O command to clear the data after processor 41 has read it, or reader 44 may be configured to clear the data after it has sensed that processor 41 has read it, or after a period of time greater than the periodic contact interval used by processor 41. In another implementation, reader 44 may be configured to generate an interrupt signal to processor 41 when data is present, and the second code may include instructions that direct processor 41 to respond to the interrupt signal by reading the data from reader 44 and clearing the interrupt. The second code may further include, as an option, instructions that direct processor 41 to generate an I/O signal that causes the above-described audible indicator to sound in response to processor 41 receiving data from reader 44. The above instructions may include conventional I/O instructions that direct the communications with reader 44 and the indicators. Different portable consumer device 5 may store and provide different URIDs to different validation entities 80. A uniform resource identifier (URID) may comprise a uniform resource locator (URL), an Internet-protocol address (IP-address), or any other type of identifier that can identify an entity on a communications network. If a portable consumer device 5 does not provide a URID to validation entity 80, verification token 40 may store a URID to a default validation entity 80. In some configurations, some verification tokens 40 may be co-branded with respective issuing banks and/or co-branded merchants, and only work for portable consumer devices that are co-branded with the same issuing banks/merchants, and each issuing bank/merchant may have its own validation entity 80 with its own URID. In such a configuration, these verification tokens 40 may store the URIDs to their respective co-branded validation entities 80. Instead of, or in addition to, this configuration, some verification tokens 40 may be associated with respective payment processing networks 70, and each such network may have its own validation entity 80. In such a configuration, these verification tokens 40 may store the URIDs to their respective associated validation entities 80. Accordingly, the second code of verification token 40 may be further configured to direct data processor 41 to only use a default URID stored by token 40, or to use a default URID if consumer portable device 5 does not provide token 40 with a URID to entity 80. As yet another implementation, verification token 40 may include code that directs processor 41 to select one of a number of URIDs stored in token 40 based on a bank number provided in the identification information or embedded in the account number. The above further direction and codes may be implemented with conventional I/O instructions, memory access instructions, and CPU logical and control instructions. One or more URIDs to validation entities may be stored in computer-readable memory 42, as illustrated in the example shown in FIG. 5.

Referring back to FIG. 1, A third code of verification token 40 directs data processor 41 to establish communications with validation entity 80 using networking facility 14 of computer 10. The operating system of computer 10 comprises one or more software modules and application programs, generically called "network services modules" herein, that can access networking facility 14 and set up communications sessions to entities on communications network 31. Such network services modules include Microsoft's Windows Communications Foundation (e.g., .NET 3.0, .NET 4.0, etc.), Apple's CFNetwork Framework, the networking section of the Unix and Linux operating system kernels, the OS Services Layer and the Base Services Layer of the Symbian operating system, Internet browsers, and the like. Each of these network services modules is non-exclusive (e.g., capable of serving more than one processor and more than one process/application) and provides an application programming interface (API) to a collection of functions that a processor can access using respective function calls. With these API facilities, a collection of function calls can be readily constructed for a processor to execute that enables the processor to establish a communications channel with an entity on a communications network coupled to networking facility 14, and to exchange messages and data with the entity. The third code of verification token 40 comprises such a collection of function calls to the API of a network services module of computer 10, including one or more function calls that provide the universal resource identifier (URID) for validation entity 80 and an instruction to establish a session with the validation entity. The session may be a secure socket layer (or secure transport layer) session (e.g., SSL session) with mutual authentication. As part of establishing the session in some implementations, the third code of verification token 40 may include directing data processor 41 to provide, or to cause to be provided, a network address for the token to the computer's network services module and to validation entity 80. The network address may be static or dynamic, the latter of which may be obtained through API function calls to the computer's network services module. The network address may an IP address.

If token 40 wishes to use an Internet browser for a network services module, it may further comprise API function calls to the computer's operating system to initiate an instance of the browser and provide it with access to the browser instance. In some implementations, such as when verification entity 40 stores the URID of validation entity 80, the third code may direct the data processor 41 to establish communications with validation entity 80 well before user 1 presents consumer portable device 5 to reader 44, and before processor 41 reads device data from reader 44. Verification token 40 and validation entity 80 may keep the communications session active until device 5 is presented to reader 44, and between times that device 5 is presented to reader 44, by intermittently exchanging "heartbeat" messages. For example, verification token 40 may periodically, aperiodically, or randomly send messages to validation entity 80 confirming its presence in the session, and validation entity 80 may send a reply message confirming its presence in the session.

The third code may be executed in response to data being received by processor 41 from reader 44, or may be executed prior to receiving data from reader 44. In the latter case, the third code may include, as an option, instructions that direct processor 41 to send an I/O command to reader 44 to enable its reading capability after processor 41 has established communications with validation entity 80.

A fourth code of verification token 40 directs the data processor 41 to transmit at least a portion of identification information to validation entity 80 by way of networking facility 14 of computer 10, wherein the identification information is preferably transmitted in encrypted form. If an SSL session has been established, the fourth code may direct data processor 41 to pass the identification information to the computer's network services module using appropriate function calls to the API for the network services module, and the identification information may be transmitted in the SSL session, where the transmitted and received data are encrypted by a session key. For an additional layer of security, the fourth code may further comprise code that directs processor 41 to encrypt the identification information with the help of security module 43 using an encryption key stored in token 40 before providing it to networking facility 14. These instructions may include conventional I/O instructions that direct the communications with security module 43 to pass the identification information to module 43 and to receive back the encrypted information. An encryption key for this may be stored in computer-readable medium 42 or in security module 43.

A fifth code for some implementations of verification token 40 directs data processor 41 to obtain merchant identification information that identifies the merchant of merchant website 20, and the previously-described fourth code may further include code that directs the data processor 41 to transmit the merchant identification information to validation entity 80 by way of the networking facility 14 of computer 10. The fifth code may further include code that directs data processor 41 to display a dialog box to user 1 on computer 10 that prompts the user to enter a merchant name or identifier into a dialog box, where the merchant identifier may be displayed on the merchant's checkout page. The code may comprise function calls to the graphical user interface of the operating system of computer 10 to open, read, and then close a dialog box on user interface 13. This code may also comprise code that directs processor 41 to execute function calls to the computer's internet browser to query the browser for the URL (or URID) or network address (e.g., IP address) of the entity that provided the content of its active browser session (which presumed to be the merchant's checkout page), and instructions that direct processor 41 to extract the merchant's name or identifier from the obtained URL or URID. Instead of extracting the merchant name or identifier from the obtained URL or URID, the fifth code may include code that directs processor 41 to execute function calls to the computer's internet browser to query a special field on its active browser session (which is the merchant's checkout page), where the special field has been pre-arranged by the merchant to contain the merchant's identifier and is known to token 40 for this purpose. The fifth code may further include code that directs processor 41 to collect a merchant transaction identifier along with the merchant identifier, either by asking the user to enter this transaction identifier into the above-described dialog box, or by obtaining it from another special field on the merchant's checkout page, which has been pre-arranged by the merchant to contain this transaction identifier. The above-described codes can be readily augmented to implement this collection of the transaction identifier. The merchant transaction identifier, which may comprise a number, can be provided to entity 80 by token 40, along with the identification information of device 5 and the merchant identifier. Entity 80 may then include this transaction identifier with the other information it sends to merchant 20 so that merchant 20 can match the information from entity 80 to the transaction that it is conducting with user 1 at its website, with the correlation being done on the basis of matching the received transaction identifier to the transaction identifier that has been assigned by the merchant to the transaction that the merchant is conducting with user 1. The previously-described fourth code may further include code that directs the data processor 41 to transmit the merchant transaction identifier to validation entity 80 by way of the networking facility 14 of computer 10. Alternatively, or in addition, the above-described transaction identifier may comprise the network address (e.g., IP address) of the user's computer 10. Both validation entity 80 and merchant 20 will see the same network address for the user's computer 10 within any given time period for conducting a transaction, and merchant 20 can use the computer's network address to correlate the data received from validation entity 80 to the active purchase session. Validation entity 80 may obtain the network address of computer 10 from the token 40 (which in turn obtains it from the active browser session), or may obtain the network address from the source IP address of the network packets it receives from computer 10/token 40.

Verification token 40 may be configured to work with a selected validation entity 80 as a default if it does not read a URID of a validation entity 80 from portable consumer device 5. If a URID of a validation entity 80 from portable consumer device 5 is read, then the default is overridden. This configuration enables verification token 40 to be used for other purposes, such as described in co-pending U.S. patent application Ser. No. 12/780,657, entitled "Verification of Portable Consumer Devices," filed May 14, 2010. Also, verification token 40 may be cobranded to a specific merchant and may have the URID of the cobranded validation entity 80 stored in its memory. In this case, the above fifth code and the corresponding collection of merchant identifier is not needed.

In yet further implementations, verification token 40 may contain the URID of validation entity 80, which handles validation requests for several different co-branded portable consumer devices 5. In addition, each of these co-branded devices 5 may hold a URID to a co-branding merchant. The merchant URID is read by verification token 40, such as directed by the above-described second code, and provided to validation entity 80 as the merchant identifier along with the device's identification information, as directed by the above-described four code. Validation entity 80 can then send the validated identification information to the merchant URID.

In view of the above disclosure, the above codes of verification token 40 can be readily implemented by one of ordinary skill in the art without undue experimentation. The use of function calls to various application programming interfaces (APIs) of the operating system of computer 10 its support modules, facilities, and its applications is well known to the software art, and one of ordinary skill in the art will be able to construct instructions and API function calls to implement the above-described codes and tasks in view of this disclosure without undue experimentation.

Figure 2:
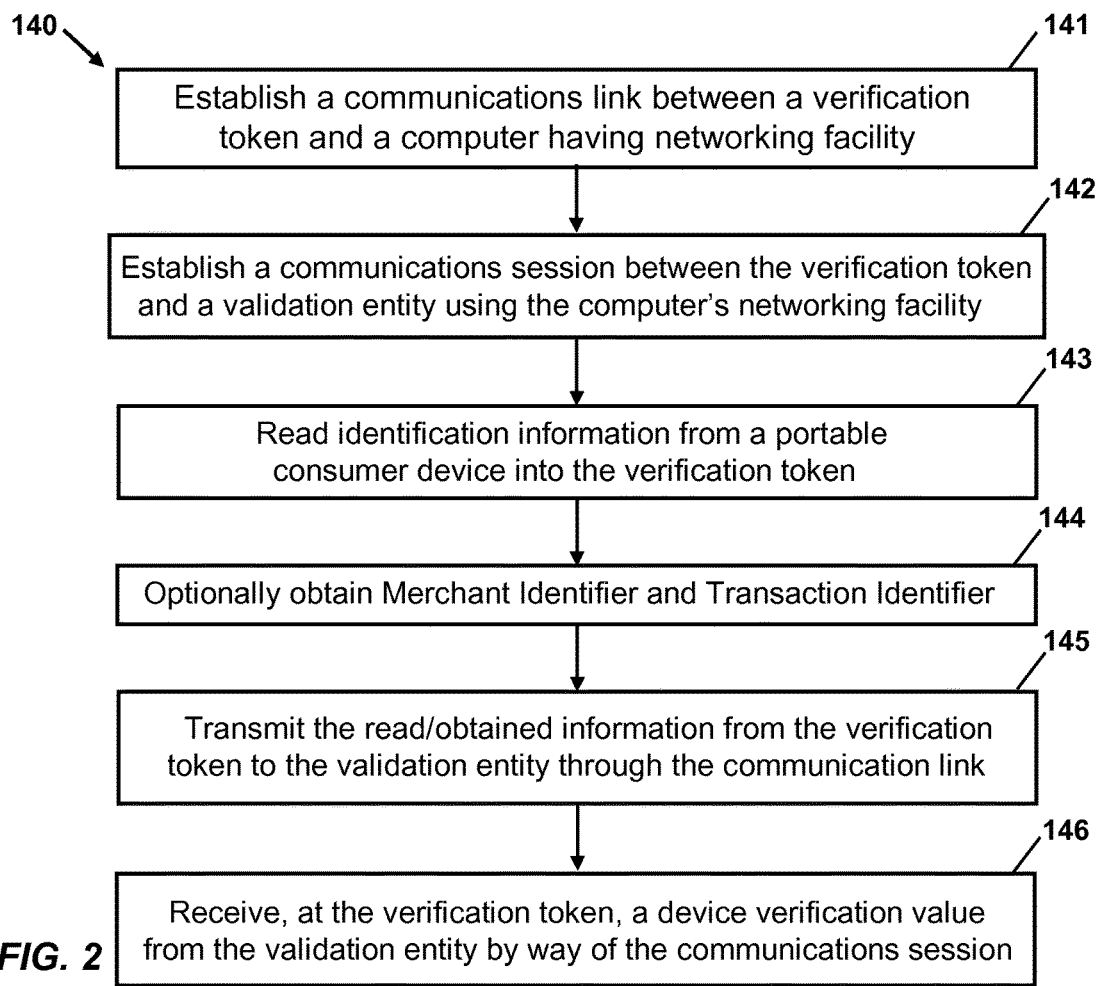
FIG. 2 illustrates an exemplary method embodiment that can be used by a verification token.

FIG. 2 illustrates an exemplary embodiment 140 of a method that can be used by verification token 40. Exemplary method 140 comprises a plurality of actions 141-146. Action 141 comprises establishing a communications link between the verification token and the computer, with the computer having a networking facility, as described above. Action 142 comprises establishing a communications session between the verification token and a validation entity using the computer's networking facility and a network services module therefor. Action 143 comprises reading identification information from a portable consumer device 5 into the verification token using a reader, such as reader 44. In some implementations, action 143 may precede either or both of actions 141 and 142. Action 144 is optional and comprises obtaining a merchant identifier and/or merchant transaction identifier related to the transaction, either from the user directly or from a webpage on the user's computer, as described above. Action 144 comprises transmitting the read identification information, and optionally the obtained merchant identifier and transaction identifier, from the verification token to the validation entity through the communications session, the identification information and identifiers preferably being transmitted to the validation entity in encrypted forms. Action 144 may comprise directing the communications session to encrypt the identification information and identifiers, and/or encrypting the identification information and identifiers using an encryption key stored in the token. A triple DES based algorithm may be used for both encryptions. Action 146 is optional and occurs after transmitting the identification information. Action 146 comprises receiving, at the verification token, a device verification value from the validation entity by way of the communications session.

Figure 3:
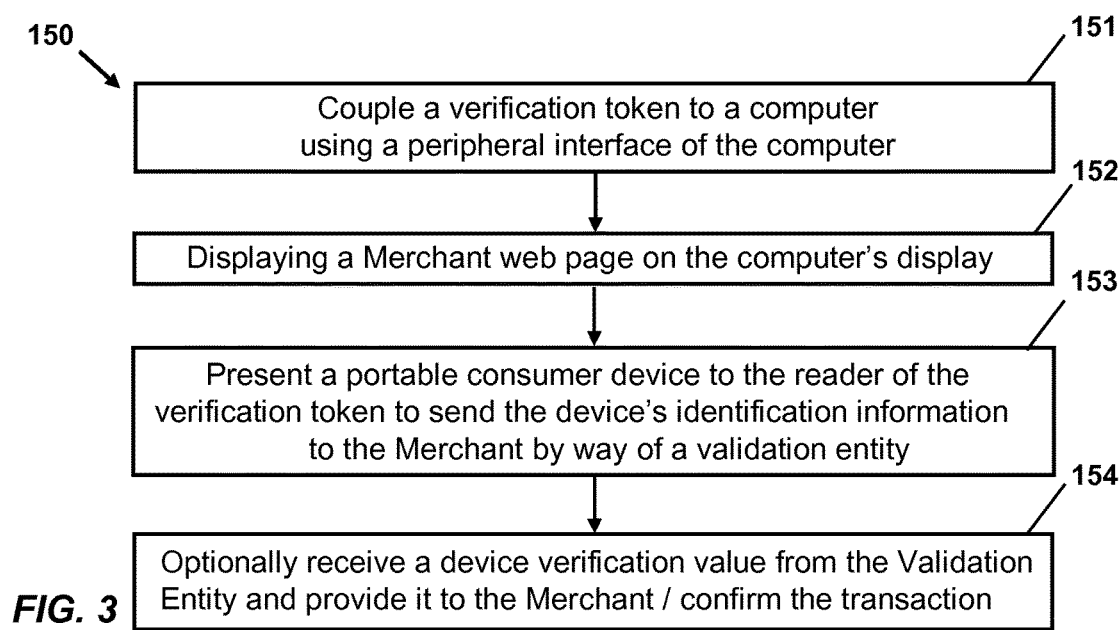
FIG. 3 illustrates an exemplary method embodiment that can be used by a user of a verification token.

FIG. 3 illustrates an exemplary embodiment 150 of a method for a user to use verification token 40 and the like. Exemplary method 150 comprises a plurality of actions 151-154. Action 151 comprises coupling a verification token, such as token 40, to a computer, such as computer 10, using a peripheral interface of the computer. Action 152 comprises displaying a merchant web page on the computer's display using an Internet browser, the merchant web page preferably being a checkout page for a transaction between the user and the merchant. Action 153 comprises presenting a portable consumer device 5 to the reader of the verification token to send identification information contained in device 5 to a merchant via validation entity 80. If device 5 has a magnetic stripe, action 153 may comprise swiping the magnetic stripe through a magnetic stripe reader of the verification token. If device 5 comprises a wireless communications interface, action 153 may comprise waving device 5 near the reader of verification token. Action 154 comprises optionally receiving a device verification value from validation entity 80 and optionally providing the value to the merchant via the merchant's checkout page. Action on 154 also comprises confirming the transaction (such as by clicking the "Submit" button or "Continue" button on the merchant's checkout page, or equivalent button). The method may include further optional actions by the user, such as providing a merchant identifier, transaction identifier, and/or password by way of one or more dialog boxes, as described above and below in greater detail.

As indicated above, validation entity 80 may use a first validation test to validate verification token 40. For this, verification token 40 may send its serial number to validation entity 80, along with a message encrypted by an encryption key, with the message and encryption key being known to token 40 and entity 80 (but not the general public), and with the encryption key further being uniquely assigned to the token's serial number. Validation entity 80 has a database of serial numbers and the corresponding uniquely-assigned encryption keys (or stored algorithms for generating said keys), and can validate that verification token 40 has sent the correct message for the serial number. For this, verification token 40 may comprise a serial number and unique encryption key embodied in a computer-readable medium, the unique encryption key being unique to verification token 40 (see FIG. 5 for an exemplary implementation, "Serial Number" and "Datum for Encrypted message"), and code that directs data processor 41 to send the serial number and a message encrypted by the unique encryption key to validation entity 80. The message may be pre-stored on the computer-readable medium (e.g., stored in "Datum for Encrypted message" in FIG. 5), or derivable from information known to both verification token 40 and validation entity 80, such as a message derived from an algorithm applied to the current date, serial number of token 40, and/or session key of the communications session between token 40 and entity 80. In this manner, the message sent by token 40 to validation entity 80 is verifiable by validation entity 80 using information stored at the validation entity. The computer-readable medium for the above tasks may be located in computer-readable medium 42 and/or security module 43. The above codes may include I/O instructions to security module 43, and function calls to the API of the computer's network services module.

As an option, verification token 40 may send, from time to time, one or more pieces of machine-unique information of computer 10 to validation entity 80, which may check this information against a database of computer information associated with known fraudsters. Such machine-unique information may include the serial numbers of processors, disk drives, and operating systems of computer 10. Verification token 40 may comprise code that directs data processor 41 to obtain one or more pieces of machine-unique information from computer 10, and to send the machine-specific information to validation entity 80. This code may include function calls to the API of the computer's operating system to obtain the information, and function calls to the API of the computer's network services module to send the information to validation entity 80.

As another option, verification token 40 may be configured to prompt user 1 for a password to activate one or more features of token 40. The password may be stored on a computer-readable medium located in security module 43 or in computer-readable medium 42 (see FIG. 5 for an exemplary implementation of the latter). The password may be provided to user 1 on a piece of paper by the provider or seller of token 40. Token 40 may be sent to user 1 through the mail by or on behalf of an issuing bank, or may be purchased by user 1 in a store. Token 40 may be configured to require that the password be entered each time the user wishes to present a consumer portable device 5, and/or each time token 40 is coupled to a computer 10. For this, verification token 40 may further comprise code embodied on computer-readable medium 42 that directs data processor 41 to prompt the user to enter a password on a keyboard of computer 10 in response to token 40 being initially coupled to computer 10 and/or in response to device 5 being presented to token 40, to read a password entered by the user, and to compare the entered password against a stored password embodied on the computer-readable medium. This code may comprise API function calls to the graphical user interface of the operating system of computer 10 to open a display box on user interface 13 to request and receive a password from user 1, I/O instructions, memory access instructions, and CPU logical and control instructions. Verification token 40 may further comprise one or more of the following:

(1) code embodied on computer-readable medium 42 that directs data processor 41 to initiate and/or allow the above-described communications with computer 10 in response to an entered password matching the stored password;

(2) code embodied on computer-readable medium 42 that directs data processor 41 to initiate and/or allow the above-described communications with validation entity 80 in response to an entered password matching the stored password;

(3) code embodied on computer-readable medium 42 that directs data processor 41 to activate reader 44 and/or to accept identification information from reader 44 in response to an entered password matching the stored password; and (4) code embodied on computer-readable medium 42 that directs data processor 41 to initiate and/or allow the above-described transmission of identification information (and optionally merchant or transaction information) to validation entity 80 in response to entered password matching the stored password.

These codes may be done with I/O instructions, memory access instructions, and CPU logical and control instructions. They, alone or in combination, prevent the transmission of identification information to entity 80 when the entered password is not the same as the stored password, and thereby comprise code embodied on the computer-readable medium that directs the data processor for doing so. One of ordinary skill in the art will be able to construct the instructions and API function calls to implement the above-described codes in view of this disclosure without undue experimentation. As further protection, validation token 40 may further comprise code embodied on computer-readable medium 42 that directs data processor 41 to establish a user name for the token by presenting user 1 with a dialog box to receive input designating a username, and by storing the username in computer-readable medium 42 (example shown in FIG. 5). The above codes for processing the password may be further augmented to include requesting a username for the token and comparing the received username with the stored username for a match, and including a match as a condition that must be met in each of the four above codes that initiate or allow various actions to be done. These codes may be done with I/O instructions, memory access instructions, and CPU logical and control instructions.

In further implementations, validation token 40 may further comprise code embodied on computer-readable medium 42 that directs data processor 41 to establish one or more shipping addresses and/or billing addresses in the token that token 40 can provide to validation entity 80 along with the identification information and merchant information that it sends to entity 80. Each shipping address and/or billing address may be associated with a portable consumer device. The code may direct processor 41 to present a series of dialog boxes to the user by way of the computer's user interface 13 to receive the address information and the account number (or last four digits thereof) of the portable consumer device 5 that is to be associated to the address information, and to store the address information in a computer-readable medium, such as medium 42 (as illustrated by the example shown in FIG. 5). Token 40 may further comprise code embodied on computer-readable medium 42 that directs data processor 41 to access the address information in response to a request being sent to validation entity 80 (the address information may be selected among many stored addresses based on the account number sent in the request), and to include the address information in the other information that token 40 sends to entity 80 in the request. The code may direct data processor 41 to encrypt the address information with an encryption key stored in token 40. The code may be configured to direct processor 41 to only send the address information when the locations for the information on the merchant checkout page are blank, thereby allowing the user to override any address information that may be stored in token 40. As another approach, the code may direct data processor 41 to fill the address information into appropriate locations of a merchant checkout page, such as when a dCVV2 value is received back from validation entity 80. The code may be configured to direct processor 41 to only fill in the address information when the locations for the information on the merchant checkout page are blank. The filling code may be further configured to direct data processor 41 to use shipping and/or billing information stored on portable consumer device 5 when shipping and/or billing information is not store in token 40 for the account number of device 5, and further if the locations for the shipping information on the merchant checkout page are blank. The filling code may include code that directs data processor 41 to locate a browser session on the computer that has a form fields for address information and/or a device verification value, and to fill the address fields with the selected address information. This can include function calls to the API of the Internet browser to search the active web page or all open web pages for an input field marked as name, address, city, postal code, country, and CVV, and to input the datum of the selected address information into the appropriate fields. The above codes may be implemented with API function calls, I/O instructions, memory access instructions, and CPU logical and control instructions.

In each of the embodiments described herein pertaining to verification token 40, token 40 may send the identification information pertaining to portable consumer device 5 to computer 10 in a number of forms, including: (1) unaltered form ("clear form"), (2) encrypted form, (3) hashed formed (e.g., encoded), (4) signed form, (5) or any combination of these forms. These forms may be generated by portable consumer device 5, verification token 40, computer 10, or any combination thereof. In addition, verification token 40 and validation entity 80 may perform a mutual authentication process before verification token 40 sends the identification information. Token 40 may also send the merchant and/or transaction information in any of the above forms as well.

In each of the embodiments described herein pertaining to verification token 40, the above codes of token 40 and the identification information read from device 5 by token 40 may be stored independently of computer 10 and may be secure from programs (including spyware and other malicious programs) running on computer 10. In such implementations, the identification information is put in secure form (e.g., encrypted, hashed, signed, or combination thereof) by verification token 40 before the information is provided to computer 10. Accordingly, securing the information is not dependent upon the security of computer 10. Symmetric or asymmetric keys may be used for encryption and signing. The keys for a verification token 40 may be unique with respect to other verification tokens (that is, the keys for a token may be unique to that token). Keys for a token, and particularly symmetric keys, may be based upon a uniquely assigned serial number for the verification token, which the token can communicate to validation entity 80 in an initial communication. Both the verification token and the validation entity may have a shared secret on how to derive a key from the token's serial number, such as by manipulating and/or replacing selected digits of the serial number. A number of keys may be derived from the unique serial number using respective shared secrets. Thus, the challenge and response messages used in a mutual authentication process between a verification token and a validation entity may be signed using respective keys derived from the serial number of the verification token.

It may be appreciated that in some implementations of verification token 40 may be configured to work with selected consumer payment devices 5, such as those issued by a selected bank, or configured to work with a selected merchant website 20.

Verification token 40 may further comprise codes that directs processor 41 to send heartbeat messages to validation entity 80, to send a unique identifier of the token to entity 80, and to obtain one or more unique identifiers of computer 10 from computer 10 and to send these unique identifiers to entity 80.

Validation Entity 80.

Having described various embodiments and implementations of verification token 40, various embodiments and implementations of validation entity 80 are now described. Validation entity 80 comprises a system having one or more servers coupled to a communications network that can receive a request from a verification token 40 to process (e.g., to validate) the identification information that the token has read from a portable consumer device 5, and to forward data representative of at least a portion of the identification information to the appropriate merchant website 20 if the identification information passes one or more validation tests. If the validation tests are passed, validation entity 80 may also, as an option, provide a device verification value (dCVV2) to token 40 and the payment processing network 70. One of the servers of entity 80 is shown in FIG. 1; the server comprises one or more processors 81 electrically coupled to each of a tangible computer-readable medium 82, a user interface 83, one or more databases 86, and a networking facility 84, the latter of which is coupled to first and second communications networks 31 and 32. User interface 83 comprises one or more video output devices (e.g., displays, screens) and one or more input devices (e.g., keyboard, mouse, trackball, etc.), which enable an administrator of entity 80 to receive information from the server and to provide input to the server. Computer-readable medium 82 may comprise a combination of semi-conductor memory and non-volatile storage, such as one or more disk drives and/or non-volatile memory.

Computer-readable medium 82 stores an operating system for the server, which enables processes and applications to be run by processor(s) 81, and enables codes for directing the operation of processor(s) 81 to be run. The operating system provides services to these processes and applications, and enables these processes and applications to access components of user interface 83, portions of computer-readable medium 82, networking facility 84, and other components of entity 80. The operating system may be full featured. Specifically, the operating system provides one or more I/O communications modules that enable processor(s) 81 to communicate with user interface 83 and databases 86. Each I/O communications module has an application programming interface (API) with a collection of functions that a processor 81 can call in order to access the components. The operating system of entity 80 also comprises one or more network services modules that can access networking facility 84 and set up communications sessions to entities on communications networks 31 and 32, and with SMS relay server 35. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian operating system, and the like. Each of these network services modules can be non-exclusive (e.g., capable of serving more than one processor and more than one process/application) and each provides an application programming interface (API), which has a collection of functions that a processor 81 can call in order to manage communications with another entity. With these API facilities, a collection of API function calls can be readily constructed for a processor to execute that enables the processor to establish a communications channel with an entity on a communications network coupled to networking facility 84, and to exchange messages and data with the entity. The above operating system, modules, and APIs all include instructions that direct the operation of processor(s) 81.

One or more databases 86 may be configured as database servers, which processor(s) 81 can access via networking facility 84 over a private communications network 87, which is illustrated by the dashed line in FIG. 1. Validation entity 80 conventionally has a clock 88 for tracking time and dates for various applications. Clock 88 may be a simple counter of seconds, or fractions thereof, that can be read by processor 81 by an I/O operation, or may comprise a more complex arrangement of hardware or firmware that can provide the various components of the current date and time (year, month, day, hour, minute, and second) in various registers that can be read by processor 81 through the execution of one or more I/O operations.

Validation entity 80 can process identification information transmitted from a plurality of different verification tokens 40 (e.g., millions of tokens), and can process any number of transmissions by a particular token 40. Before receiving identification information for a portable consumer device 5 from a token, the issuing bank for the device may provide validation entity 80 with the digital magnetic fingerprint of the device, and/or the algorithm that the device uses to generate the device's variable datum (e.g., CVC3, dCVV, cryptogram). When validation entity 80 receives identification information from a verification token 40 for a specific portable consumer device 5, it can access its record of the digital magnetic fingerprint and/or datum/cryptogram algorithm for the specific device, and compares the received fingerprint and/or variable datum (e.g., CVC3, dCVV, cryptogram) against its record of the fingerprint and/or variable datum (the record of the variable datum being computed according to algorithm in the entity's records). If the received fingerprint and/or variable datum match(es) the recorded fingerprint and/or variable datum, validation entity 80 can validate the identification information and forward data representative of at least a portion of it to the appropriate merchant, as determined by one or more of the following: (1) on an a priori basis in the case of a co-branded card, (2) by examining a portion of the account number against a listing of co-branded cards, (3) by receiving an indication from the token of the intended merchant. Depending upon implementations, the data representative of at least a portion of the identification information sent to the merchant by entity 80 may comprise a portion or all of the received and verified identification information, or may comprise a substitute account number that the merchant is to use in place of the PAN, or a payment-processing transaction number, or a combination of the above (e.g., card holder name, substitute account number, and payment-processing transaction number). Entity 80 may obtain the substitute account number and/or payment-processing transaction number from payment processing network 70, and entity 80 may provide network 70 with some or all of the identification information that corresponds to the substitute account number and/or payment-processing transaction number. In this way, network 70 will be able to correlate the incoming transaction having the substitute account number and/or payment-processing transaction number with the user's account specified by the identification information received by entity 80. Alternatively, entity 80 can generate one or both of the substitute account number and/or payment-processing transaction number, and send it/them to payment processing network 70 along with the identification information. The transaction number may comprise alphanumeric characters, and may be sent by merchant 20 to acquiring bank 50, and then to network 70, in a discretionary data field present in current credit-card processing flows.

Validation entity 80 comprises a plurality of codes embodied on computer-readable medium 82 for directing processor(s) 81 to conduct various actions. Validation entity 80 may comprise a first code that directs data processor 81 to communicate with a plurality of verification tokens 40 over communications network 31, with a computer disposed between each verification token and the communications network. The first code can include code for establishing a communication session with each token, which may include establishing a secure socket layer (SSL) session with mutual authentication and encryption based on a triple DES algorithm, and instructions for sending and receiving messages to verification token 40 through the communications session. The first code may also include instructions to send "heartbeat" messages to the verification token and to receive heartbeat messages from the token to keep the session alive between times that identification information is not being sent. The first code may also include instructions that direct data processor(s) 81 to receive and verify an encrypted serial number or other identification uniquely assigned to the verification token (not to the device 5) in order to validate the authenticity of the token. The first code may also include instructions that direct data processor(s) 81 to compare the token's serial number or other unique identification against a first list of tokens known to have been used to conduct fraudulent activities. If found on the first list, the first code can direct processor(s) 81 (and hence validation entity 80) to decline processing of any identification information sent by token 40, and refuse to forward identification information from the token to merchant websites 20. The first code may also include instructions that direct data processor(s) 81 to send a message to a verification token 40 to request that the token send to entity 80 a unique datum of information about computer 10, such as the serial number of processor or disk drive of computer 10. Entity 80 may further comprise code that directs the processor to compile a second list of serial numbers of computers 10 known to be used to conduct fraudulent activities, and the first code may further comprise instructions that direct processor 81 to compare the information it receives about the computer that each verification token communicates through against this second list. If a token 40 is found to be using a computer that is on the second list, the first code may direct processor 81 to add the serial number of the token to the first list. Validation entity 80 can then decline processing of any identification information sent by a token 40 that provides computer information found on the second list, and can refuse to forward identification information from the token to merchant websites 20. These actions may be effected by code that directs processor 81 to take the actions.

A second code directs data processor 81 to receive identification information sent by the verification token in the communication session established by the first code. If the identification information is encrypted with an encryption key that has been assigned beforehand to the token (i.e., an encryption key that is different from a session key of an SSL session), the second code may further direct data processor 81 to decrypt the identification information. The identification information may be encrypted by a session key of an SSL session or by an encryption key stored in verification token 40 and known to validation entity 80, or may be doubly encrypted by both keys.

By validating token 40 against the above first and second lists (i.e., by verifying that token 40 has not thus far been involved in fraudulent activities), validation entity 80 has some degree of confidence that the identification information sent by token 40 is valid, and can, in some implementations, forward the identification information to the appropriate merchant website. To increase the degree of confidence, validation entity 80 may further comprise a third code that directs data processor 81 to compare a digital fingerprint received in the identification information, if present, with the stored copy of the digital fingerprint that entity 80 has for the account number provided with the identification information. If the digital fingerprints match to an acceptable degree, validation entity 80 can validate the identification information and forward it to the appropriate merchant website. If there is no digital fingerprint in the received identification information, the third code may include instructions that direct data processor 81 to compare the variable datum received in the identification information, if present, with a copy of the variable datum for the account number provided with the variable datum in the received identification information. Processor 81 may generate the copy of the variable datum from an algorithm stored at entity 80, or from a list of values for the variable datum stored at entity 80. If the received variable datum and entity 80's copy of the variable datum match, then validation entity 80 can validate the identification information and forward it to the appropriate merchant website. The above validation tests and further exemplary codes for implementing the validation tests are described in a section below in greater detail.

Validation entity 80 further comprises a fourth code that directs data processor 81 to forward (e.g., send) data representative of at least a portion of the received identification information to the appropriate merchant in response to validation entity 80 validating the token and/or identification information in any of the ways described above. In a first set of implementations, validation entity 80 is associated with a selected merchant, and validation entity 80 may send the data to the website 20 of that selected merchant. In these implementations, the fourth code may comprise instructions that direct data processor 81 to send the data to a website of the selected merchant. In a second set of implementations, validation entity 80 may process a number of portable consumer devices 5 that are co-branded by a number of merchants and associated issuing banks, where the co-branded devices associated with each co-branded merchant have account numbers that incorporate a common sub-number (e.g., co-branded bank number). In these implementations, the fourth code may comprise instructions that direct data processor 81 to identify the common sub-number in the account number provided in each received and validated identification information, to compare the identified common sub-number against a list of sub-numbers of the co-branded devices to find a match to a merchant in order to select a merchant to send the information to, and to send the data representative of at least a portion of the identification information to a website of the selected merchant. In a third set of implementations, validation entity 80 may receive an indication of the merchant along with the received identification information, and the fourth code may include instructions that direct data processor(s) 81 to select a merchant based on the merchant identification information and to send the data representative of at least a portion of the validated identification information to a website of the selected merchant. As indicated above, the merchant indication may be a URID or network address (e.g., IP address) to a website of the selected merchant. Entity 80 may have a database 86 that associates such websites with merchant identification. In any of the above implementations, an particularly in the latter implementation, the code may direct data processor(s) 81 to also send the last name or full name of the holder of portable consumer device 5 so that merchant 20 can correlate the validated identification information to an open purchase session on its website. The code may also direct data processor(s) 81 to also send any transaction identifier that it receives from token 40. The code may also direct data processor(s) 81 to obtain the network address of computer 10 from the source IP address field of the network packets sent from computer 10, and to send this network address as the transaction identifier to merchant 20.

If the above-described data representative of at least a portion of the received identification information comprises a substitute account number and/or a payment-processing transaction number, then the fourth code further comprises instructions that direct data processor(s) 81 to obtain one or both of these numbers, either by generating them or requesting them from payment processing network 70. In this case, the fourth code further directs data processor(s) 81 to send at least a portion of the received identification information to payment processing network 70 so that network 70 can correlate the received identification information with these numbers when they are received in a transaction from an acquiring bank 50.

Validation entity 80 may be configured to implement two or more of the above general sets of implementations. For example, validation entity 80 may have code that directs data processor(s) 81 to examine communications from each token 40 for an indication of a merchant. If a merchant indication is provided, then this code of validation entity 80 may direct data processor(s) 81 to send the validated identification information to the identified merchant (third set of implementations). If a merchant indication is not provided, then this code of validation entity 80 may direct data processor(s) 81 to examine the account number for a sub-number that is on a list of common sub-numbers of the co-branded devices to find a match to a merchant, and if found, to forward the validated identification information to the matched merchant (second set of implementations). If this code of validation entity 80 does not find a matching sub-number, it may then direct data processor(s) 81 to forward the validated identification information to a selected merchant.

Validation entity 80 may send to merchant computer 20 all of the information that website 20 needs to complete the transaction, such as shipping address, card expiration date, card holder name, etc. All of this information may be conveyed to validation entity 80 by consumer portable device 5 through token 40, or validation entity 80 may have all the information securely stored at its location in one of its databases 86, or validation entity 80 may obtain the information from an issuing bank 60 or payment processing network 70. When verification token is co-branded with a specific merchant, validation entity 80 can also obtain the serial number of token 40 and provide it to merchant computer 20, and merchant computer 20 can use the received token serial number to correlate the other information received from validation entity 80 to the active purchase session of the user, as described below in greater detail. Entity 80 may comprises additional codes that direct its processor(s) 81 to perform these actions.

As indicated above, validation entity 80 may be further configured to generate or otherwise obtain a dCVV2 value for the identification information that it has validated, and to send the dCVV2 value and identification information to both the merchant and payment processing network 70. For this, validation entity 80 may comprise code that directs processor 81 to generate the dCVV2 value or obtain a dCVV2 value for the issuing bank 60 and to send it to both the merchant website 20 and the payment processing network 70, along with the validated identification information. Instead of sending the dCVV2 value to the merchant 20, or in place thereof, validation entity 80 may send the dCVV2 value to token 40, where token 40 or user 1 may enter the dCVV2 value into the CVV field of the merchant's checkout page. If both merchant 20 and token 40 receive the dCVV2 value from validation entity 80, then merchant 20 can use the dCVV2 value it receives from user 1 and token 40 (via entry onto the merchant' check out page) to verify that it has properly correlated the identification information received from entity 80 with the user's purchase session. Exemplary codes for processing the dCCV2 value by entity 80 are described section below in greater detail.

Verification entity 80 may further comprise code that directs processor 81 to send an alert text message to the communication device 7 of user 1 or send an alert e-mail message to an e-mail account of user 1 when one or more of the following events occurs: (1) when verification token 40 initiates communications with entity 80, (2) when verification token 40 reads a portable consumer device 5 of user 1, (3) when verification entity 80 receives identification information from a portable consumer device 5 or a verification token 40 associated with user 1, (4) when verification entity 80 validates said identification information, (5) when verification entity 80 sends validated identification information to a merchant (and optional sends a dCVV2 value to other entities), and (6) when verification entity 80 denies a request to send identification information to a merchant. The alerts sent by entity 80 may include information related to the events that triggered the alerts, such as a portion of account number involved and the merchant name. The alert text messages may be sent from networking facility 84 to an SMS relay server 35 that is coupled to one of communications networks 31 and 32, along with the phone number or network address of the user's communication device 7. The SMS relay server has an interface to one or more mobile communication networks, and can relay the text message to the phone number or network address provided by processor 81. Validation entity 80 may comprise the relay server. Email alerts may be sent directly to the user's e-mail account from networking facility 84. For this, networking facility 84 may comprise a conventional mail agent, which is well known to the art.

In view of this disclosure, one of ordinary skill in the art will be readily able to construct the code and instructions to implement the above-described codes without undue experimentation.

Validation entity 80 may comprise a website accessible to the user 1 that enables the user: (1) to create a password-protected management account associated with the serial number of the token, the latter of which may be provided on a slip of paper originally sent with the token; (2) to associate an e-mail address to be used for one or more of the above-described alerts; (3) to associate a mobile number and/or URID (e.g., network address) of the user's communications device 5 to be used for one or more of the above-described alerts; and (4) to select one or more of the above-described alert conditions The website may also enable the user to provide and associate the account numbers for one or more of the user's devices 5 with the password-protected account, and may further enable the user to associate the e-mails and mobile numbers for the alerts to particular devices 5 according to their account numbers. The website may also enable the user to associate a shipping address and/or billing address to one or more specific device account numbers, which validation entity 80 may provide to merchant 20 along with the identification information with each request for sending such information is made by token 40 for such a specified device account number. This association may include an option that the user can select for a specified device account that directs entity 80 to obtain the address information from the issuing bank 60 for the specified device account. The website may also enable the user to associate a shipping address and/or billing address to the token itself, which validation entity 80 may provide to merchant 20 for each request to send identification information to a merchant in which a shipping address and/or billing address has not been associated to the device account number or contained in the request from token 40.

One of databases 86 may be assigned to hold the above-described password-protected accounts of the users. When validation entity 80 receives a request from verification token 40 to send identification information to a merchant, code in entity 80 can direct processor(s) 81 to query this database 86 to find the user's password-protected account (e.g., identify the user from the token's serial number and/or the account number sent in the identification information), to determine what text message alerts and emails are to be generated and sent based on the parameters stored in the password-protected account, to identify the mobile phone number or universal resource identifier (e.g., network address) of the personal communication device to which to sent the messages, and/or to identify the email address to which to send the messages, and to send the determined messages to the identified destinations. One or more alerts pertaining to a particular request may be combined together into a single text message or email to the user. Entity 80 can also have code that directs data processor(s) 81 to determine from the account record if any shipping address information or billing address information is to be sent with the communication to the merchant 20 by looking up the settings that the user may have provided for the device account number indicated in the request message, and to send the address information to merchant 20 according to the found settings. The above codes and actions can be implemented with HTML page codes, XML page codes, and the like (e.g., web pages), conventional I/O instructions, memory access instructions, database API function calls, CPU arithmetic instructions, CPU logic instructions, and CPU control instructions. In view of this disclosure, the codes may be implemented by one of ordinary skill in the art without undue experimentation.

Figure 4:
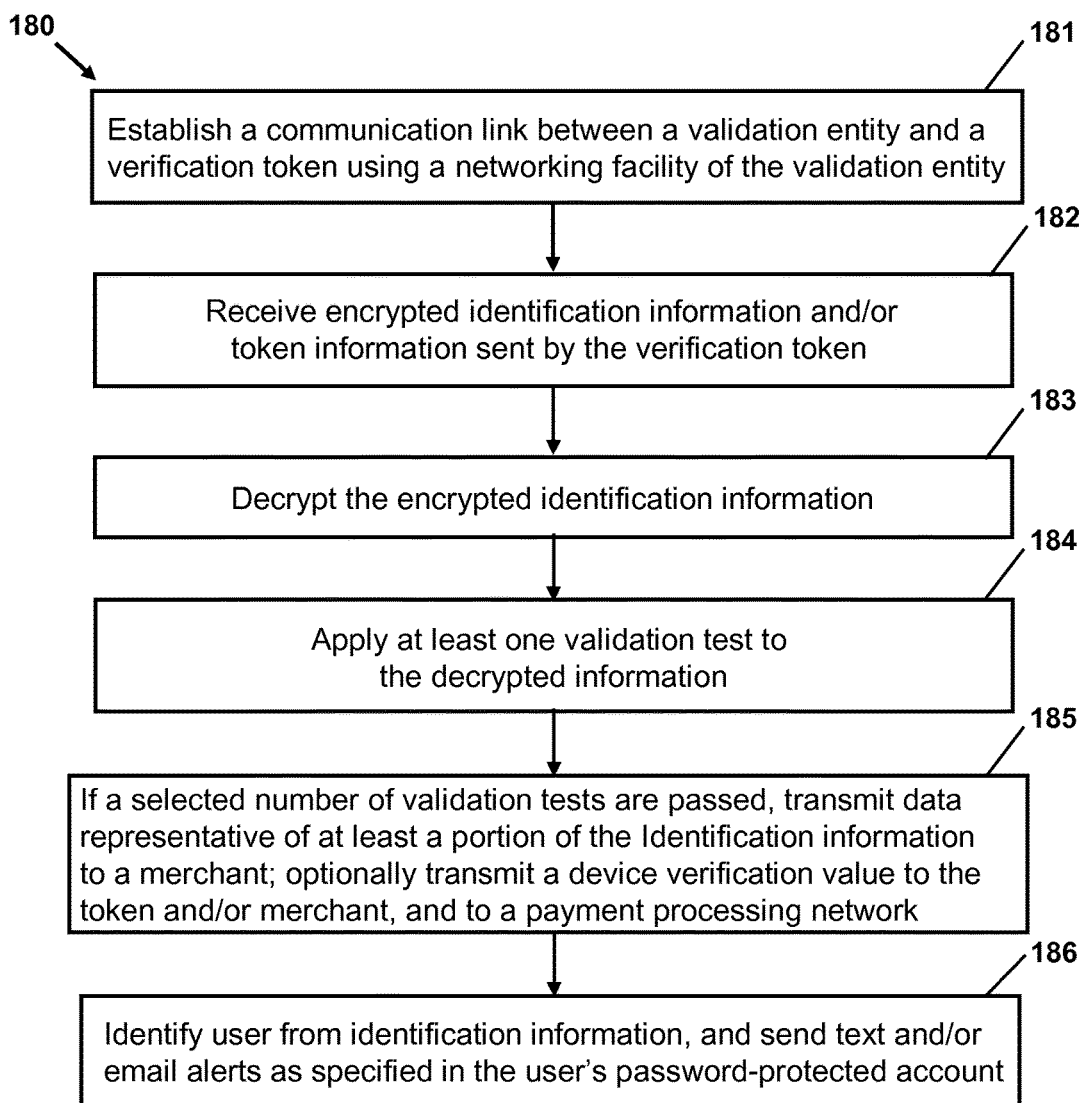
FIG. 4 illustrates an exemplary method embodiment that can be used by a validation entity.

FIG. 4 illustrates an exemplary embodiment 180 of a method that can be used by validation entity 80. Exemplary method 180 comprises a plurality of actions 181-186. Action 181 comprises establishing a communication link between validation entity 80 and a verification token 40 using a networking facility of validation entity 80. Action 182 comprises receiving encrypted identification information pertaining to device 5 and/or token information (e.g., serial number and encrypted message) sent by verification token 40. Action 183 comprises decrypting the encrypted information (e.g., encrypted identification information and/or encrypted message from the token). Action 184 comprises applying at least one validation test to the decrypted information. Action 185 comprises transmitting, if a selected number of validation tests are passed, data representative of at least a portion of the identification information to a merchant, as described above. Action 185 may also, as an option, send a device verification value (dCVV2 value) to verification token 40 and/or merchant 20, and to payment processing network 70. Action 186 comprises identifying the user (e.g., the user's account) from the identification information, and sending text and/or email alerts to the user as specified in the user's password-protected account.

Exemplary Validation Tests and Code Therefor.

As described above, a first validation test that validation entity 80 may apply pertains to verifying that verification token 40 is authentic. For this, verification token 40 may send its serial number to validation entity 80, along with a test message encrypted by an encryption key, with the test message and encryption key (or corresponding decryption key) being known to token 40 and entity 80 (but not the general public), and with the encryption key further being uniquely assigned to the token's serial number. Validation entity 80 may access a database of token serial numbers and corresponding uniquely-assigned encryption keys (or corresponding decryption keys) in one of databases 86, and may determine whether verification token 40 has sent a correct test message for the serial number that the token provided. The test message may be fixed or variable; in the latter case it may be generated based on information known to both token 40 and entity 80. The test message may be encrypted and decrypted by a triple DES algorithm, which can be implemented by a number of well known sets of computer instructions using a single symmetric encryption key. The test message may also be encrypted by a first key of an asymmetric encryption key set at the verification token 40 and decrypted by the second key (the decryption key) of the asymmetric encryption key set at validation entity 80, which can be implemented by a number of well known sets of computer instructions. To validate the encrypted test message sent by token 40, entity 80 can decrypt the test message using the key that it has, and can compare the decrypted test message to a set of acceptable messages for a match. Entity 80 may also validate the encrypted test message in the reverse way by encrypting the set of acceptable messages and comparing the encrypted test message sent by token 40 to its set of encrypted acceptable messages. If the sent test message is correct, the first validation test can be deemed to have been passed, otherwise the first validation test is deems to have failed.

To implement the above validation test, validation entity 80 may comprise code embodied on computer-readable medium 82 that directs data processor 81 to receive one or more messages from verification token 40 via networking facility 84 that has the token's serial number and encrypted test message, code that directs data processor 81 to obtain from one of databases 86 a key that has been assigned to the received serial number of the token and one or more acceptable messages that can be accepted as the correct test message, and code that directs the data processor to validate the encrypted test message from the token using the encrypted test message, the obtained key, and the obtained one or more acceptable messages. The latter validation code may comprise code that directs data processor 81 to decrypt the encrypted test message using the obtained key, and code that directs data processor 81 to compare the decrypted test message to the one or more acceptable messages to determine if the first validation test has been passed (in the case of a match between the decrypted test message and an acceptable message), or has been failed (in the case of no such match). In addition, or as another approach, the above validation code may comprise code that directs data processor 81 to encrypt the obtained acceptable messages with the encryption key for token 40 (as found in the database according to the token's serial number), to compare the encrypted test message from token 40 to the one or more encrypted acceptable messages to determine if the first validation test has been passed (in the case of a match between the encrypted test message and an encrypted acceptable message), or has been failed (in the case of no such match). An acceptable message may be obtained by accessing it directly from one of databases 86, or by generating it from information stored in one or more of databases 86. As an option, if the first validation test is failed, validation entity 80 may record the serial number of the failed token 40 and the source IP address from which the failed token 40 made the request in one of databases 86. For this, validation entity 80 may further comprise code that directs data processor 81 to obtain the source IP address from the request message and to store the source IP address and the token's serial number as one record or two separate records in one of databases 86, which may be called the failed validation database 86. This information may be accessed as port of the second validation test described below. The above codes can be implemented with conventional I/O instructions, API function calls to databases, memory access instructions, CPU arithmetic and logic instructions, and CPU control instructions. In view of this disclosure, the codes may be implemented by one of ordinary skill in the art without undue experimentation.

As a second validation test, validation entity 80 may have a database in databases 86 that tracks the serial numbers of verification tokens that have been used in fraudulent activities (e.g., suspicious tokens), and validation entity 80 may check the serial number of verification token 40 against this database. If a check of this database indicates that verification token 40 has not been involved in fraudulent activity or is not otherwise suspicious, the second validation test can be deemed to have been passed. To assist in tracking fraudulent activity back to a verification token, validation entity 80 may send the serial number of token 40 along with the dCVV2 value and account number that it sends to payment processing network 70. If network 70 later finds out that the transaction processed with the account number provided by token 40 was fraudulent, it can send a message to that effect to validation entity 80, and entity 80 may then enter the serial number of the token into the database of tokens used in fraudulent activities. To implement the second validation test, validation entity 80 may comprise code embodied on computer-readable medium 82 that directs data processor 81 to receive a message from verification token 40 via networking facility 84 that has the token's serial number, code that directs data processor 81 to have the received serial number compared with serial numbers stored in a database of databases 86 that stores serial numbers of suspicious tokens used in fraudulent transactions to determine if the second validation test has been passed (no fraudulent activity), or has been failed (fraudulent activity). This code may further include instructions that direct processor 81 to obtain the source IP address of the message from token 40, and to compare the source IP address and the serial number of token 40 to IP addresses and serial numbers in the failed validation database 86 for a match. If a match is found, the second validation test may be deemed to have been failed. Checking the token serial numbers and IP addresses in this way prevents retry attacks by fraudsters. The above codes can be implemented with conventional I/O instructions, API function calls to databases, memory access instructions, CPU logic instructions, and CPU control instructions. In view of this disclosure, the codes may be implemented by one of ordinary skill in the art without undue experimentation.

As a third validation test, validation entity 80 may send a message to verification token 40 requesting that token 40 send it one or more pieces of computer-specific information about computer 10, such as the serial numbers of one or more of the following: the computer's processor, one or more of the computer's disk drives, the computer's operating system. Validation entity 80 may receive this information and check it against a database storing computer-specific information of suspicious computers known to have been involved in fraudulent activity. If a check of this database indicates that the computer 10 used by verification token 40 has not been involved in fraudulent activity, the third validation test can be deemed to have been passed. To assist in tracking fraudulent activity back to computer 10, validation entity 80 may send the serial number of token 40 and the computer-specific information along with the dCVV2 value and account number that it sends to payment processing network 70. If network 70 later finds out that the transaction processed with the account number provided by token 40 was fraudulent, it can send a message to that effect to validation entity 80, and entity 80 may then enter the serial number of the token into the database of suspicious tokens used in fraudulent activities, and the computer-specific information into the database of suspicious computers known to have been involved in fraudulent activity. To implement the third validation test, validation entity 80 may comprise code embodied on computer-readable medium 82 that directs data processor 81 to send a message to verification token 40 requesting computer-specific information (if verification token 40 has not sent such information beforehand without prompting), code that directs data processor 81 to receive one or more data messages from verification token 40 via networking facility 84 that have the token's serial number and the computer-specific information, and code that directs data processor 81 to have the received computer-specific information compared with computer-specific information stored in a database (of databases 86) that stores computer-specific information of suspicious computers used in fraudulent transactions to determine if the third validation test has been passed (no fraudulent activity), or has been failed (fraudulent activity). The above codes can be implemented with conventional I/O instructions, API function calls to databases, memory access instructions, CPU logic instructions, and CPU control instructions. In view of this disclosure, the codes may be implemented by one of ordinary skill in the art without undue experimentation.

As a fourth validation test, validation entity 80 may compare a digital fingerprint received in the identification information, if present, with the stored copy of the valid digital fingerprint that entity 80 has for the account number specified by the identification information. If the digital fingerprints match to an acceptable degree (e.g., the degree of similarity, or correlation, of the two fingerprints being above a selected level of similarity), validation entity 80 can deem the fourth validation test as being passed. The degree of similarity between the two fingerprints may be assessed by applying a correlation function to the two fingerprints. Such correlation functions are well known to the art. Before receiving identification information for a portable consumer device 5 from a token, the issuing bank for the device may provide validation entity 80 with the valid digital magnetic fingerprint of the device, which entity 80 may store in one of databases 86. When validation entity 80 receives identification information from a verification token 40 for a specific portable consumer device 5, it accesses databases 86 for its record of the valid digital fingerprint, and compares the received fingerprint against the valid digital fingerprint to assess a degree of similarity, and to determine if the fourth validation test has been passed (e.g., the degree of similarity between the two fingerprints is above a selected level), or has been failed (e.g., the degree of similarity between the two fingerprints is below the selected level). To implement the fourth validation test, validation entity 80 may comprise code embodied on computer-readable medium 82 that directs data processor 81 to obtain the stored valid digital fingerprint for the account from one of databases 86, and code that directs data processor 81 to compare the received digital fingerprint and the stored valid digital fingerprint for similarity to determine if the forth test is passed (sufficient similarity) or failed (not sufficient similarity). The latter code may comprise code that directs data processor 81 to generating a value representative of the similarity between the two fingerprints by applying one or more correlation functions to the fingerprints, and comparing the value against a selected level. Such correlation functions, also known as probabilistic models, are known to the credit card art. The above codes can be implemented with conventional I/O instructions, API function calls to databases, memory access instructions, CPU arithmetic instructions, CPU logic instructions, and CPU control instructions. In view of this disclosure, the codes may be implemented by one of ordinary skill in the art without undue experimentation.

As a fifth validation test, validation entity 80 may perform a fifth validation test that compares a variable datum (e.g., CVC3, dCVV, cryptogram) received as part of the identification information, if present, with a set of one or more acceptable values for the variable datum that validation entity 80 has for the account number provided as part of the identification information. If the values match, validation entity 80 can deem the fifth validation test as being passed. There are number of ways that the variable datum can be configured to vary with time. As some examples, the variable datum can be configured to have its value vary with each use of portable consumer device 5, and device 5 can provide a counter value in the datum or along with the datum. Validation entity 80 or a payment processing network can use the counter value to determine what value the variable datum should have for the given counter value. This determination may be done based on an algorithm that is a function of the counter value (and/or other possible variables), or a look-up table whose entries are correlated to the counter value (the table may be cyclically repeated). The algorithm may comprise one or more random number generators, each of which accepts a starting "seed" value, whose value can be selected to customize the algorithm to a particular portable consumer device 5. The values of the look-up table may be based on the output of the algorithm. The variable datum may also be based on time, date, or other information known to both verification token 40 and entity 80, which may or may not use a counter value. Additional ways of generating the values of a variable datum are discussed in U.S. patent application Ser. No. 10/642,878 entitled "Method and System for Generating a Dynamic Verification Value" filed on Aug. 18, 2003, now issued as U.S. Pat. No. 7,761,374, and in U.S. patent application Ser. No. 11/764,376 entitled "On-Line Payment Transactions" filed on Jan. 29, 2008, now issued as U.S. Pat. No. 7,740,168. Both of these applications are incorporated herein by reference in their entirely for all purposes. In some implementations, there may be slight differences in the starting information that device 5 and entity 80 use in generating their respective datum values, such as differences in the times of their clocks, and entity 80 may generate a set of acceptable datum values based on possible slight differences in the starting information, and may compare the datum value received from device 5 with each member of the set to determine if a match exists.

A cryptogram, which typically has more characters than a CVC3 value or a dCVV value, may be generated by an algorithm in a similar way as described above, except that a piece of transaction information is usually included as an input to the algorithm. As previously described below, if token 40 seeks a cryptogram from a cryptogram-enabled device 5, it provides device 5 with dummy transaction information which is known to both token 40 and validation entity 80, but not known to the general public. When the variable datum received by entity 80 from token 40 comprises a cryptogram (which may be deduced from the character length of the variable datum or the account number of the device 5), validation 80 may look up the dummy transaction information in one of its databases 86 based upon the serial number of token 40. Validation entity 80 may determine the identity of the issuing bank 60 for the device 5 based on the device's account number, and may request the current value of the card's Application Transaction Counter (ATC) from the issuing bank 60. Entity 80 may then generate the cryptogram based on the dummy transaction information, the ATC, and other information used in the algorithm, and compare the generated cryptogram with the cryptogram received from token 40. If the cryptograms match, validation entity 80 can deem the fifth validation test as being passed. In some implementations, there may be slight differences in the ATC values that device 5 and entity 80 use in generating their respective cryptograms, and entity 80 may generate a set of acceptable cryptograms based on small incremental differences in the ATC value, and may compare the cryptogram received from device 5 with each member of the set to determine if a match exists. If a match cannot be found, the fifth validation test is deemed to have been failed. As another approach, validation entity 80 may forward a request for the cryptogram's value to the issuing bank 60 along with a copy of the dummy transaction information. Validation entity 80 may then compare the cryptogram received back from the issuing back to that received from token 40 to determine whether there is a match. As yet another approach, validation entity 80 may forward the dummy transaction information and the cryptogram received from token 40 to the issuing bank 60 with a request that the bank determine whether the cryptogram is valid or not, and to send its determination to validation entity 80. Validation entity 80 may then determine that the fifth validation test is passed if the bank sends an indication that the cryptogram received from token 40 is valid, and failed otherwise.

Before receiving identification information for a portable consumer device 5 from a token, the issuing bank for the device may provide validation entity 80 with the look-up table, algorithm (including any seed values), or other data elements that the device uses to generate the device's variable datum (e.g., CVC3, dCVV, or cryptogram), which entity 80 may store in one of its databases 86. When validation entity 80 receives identification information from a verification token 40 for a specific portable consumer device 5, it accesses its record of the look-up table, algorithm, or other data elements for the specific device 5 to determine its value or set of values for the device's variable datum, and compares the received value for a variable datum (e.g., CVC3, dCVV, or cryptogram) against its value or set of acceptable values for the variable datum to determine if the fifth validation test has been passed (e.g., a match in values is found), or has been failed (e.g., a match has not been found). To implement the fifth validation test, validation entity 80 may comprise code embodied on computer-readable medium 82 that directs data processor 81 to access the one or more stored data elements used to obtain the variable datum for the account from one of databases 86, code that directs data processor 81 to obtain one or more acceptable values for the variable datum from the one or more stored data elements, and code that directs data processor 81 to compare the received variable datum and the one or more acceptable values for a match to determine if the fifth test is passed (a match is found) or failed (a match is not found). The code that directs data processor 81 to obtain one or more acceptable values may be based upon the look-up table method described above, or any of the algorithm based methods described above. The codes may include instructions that direct data processor 81 to determine if a received variable datum comprises a cryptogram, and if so, to obtain the dummy transaction information from a database 86 based upon the serial number of the token. Depending upon the implementation for processing cryptograms, the code may further include instructions that direct data processor 81 to determine the identity of the issuing bank and to obtain an ATC value for the device 5 from the bank, and to generate one or more acceptable values of the cryptogram using the dummy transaction information, the ATC value, and other inputs used in the algorithm. Also, the code may further include instructions that direct data processor 81 to send the account information and the dummy transaction information to the identified issuing bank with a request for one or more acceptable cryptogram values. Also, instead of directing processor 81 to obtain one or more acceptable cryptogram values and to compare the cryptogram received from token 40 to the acceptable cryptogram values, the code may include instructions that direct data processor 81 to obtain the dummy transaction information as described above, to identify the issuing bank as described above, to send the account information, dummy transaction information, and the cryptogram received from token 40 to the identified bank with a request that the bank send back an indication of whether or not the cryptogram is valid, and to pass or fail the fifth validation test based on the indication sent back by the issuing bank. The above codes can be implemented with conventional I/O instructions, API function calls to databases, memory access instructions, CPU arithmetic instructions, CPU logic instructions, and CPU control instructions. In view of this disclosure, the codes may be implemented by one of ordinary skill in the art without undue experimentation.

Validation entity 80 may be configured to perform one or more of the above validation tests, and may be configured to send the validated identification information to merchant 20 (as described above), and to optionally send a dCCV2 value to verification token 40 and/or merchant 20, and to payment processing network 70, if one or more of the tests are passes. Validation entity 80 may comprise code embodied on computer-readable medium 82 that directs data processor 81 to execute a selected one or more of the validation tests and track the pass/fail results, and code that directs data processor 81 to take the above actions if a selected number of tests have been passed.

dCVV2 Provisioning by Entity 80.

Since the dCVV2 value is being sent to both the merchant (directly or relayed through verification token 40) and the payment processing network 70 (which may forward it to the issuing bank), validation entity 80 may use any method to generate the dCCV2 value, and need not use the method used by portable consumer device 5 to generate the variable datum (e.g., the CVC3 or dCVV). Validation entity 80 may generate the dCVV2 values using a pseudo-random number generator or a look-up table, or a sequential counter (such as when distributing the values from that counter over different accounts). The dCVV2 generation process can be done on a per transaction basis (fully dynamic), or for a group of transactions (semi-dynamic), the latter being for a particular device 5 or a group of devices 5. If two or more devices 5 are assigned under a common account number, the identification information sent by token 40 may comprises a device identifier as well as an account number, and validation entity 80 may use the device identifier to distinguish between the devices and to generate different dCVV2 values for the devices that are under a common account number. Validation entity 80 may use a particular dCVV2 value for a particular device 5 over a selected time period (such as three days), and then select another dCVV2 value for the particular device for the next selected time period, and so on. Moreover, validation entity 80 may receive the dCVV2 values to use during the selected time periods from the issuing bank of the device 5 in advance of the selected time periods, and store them for later use, as determined by entity 80's clock. This permits validation entity 80 to omit the action of sending the dCVV2 values to payment processing network 70. The device verification value provided by validation entity 80 may have the same format as the CVC3s and dynamic CVVs ("dCVVs") output by existing smartcard credit cards (e.g., a string of 3 or 4 numbers). As another approach, validation entity 80 may send a message to the issuing bank 60 for portable consumer device 5 to request a value to provide as the dCVV2 value; this request may include the account number and any device identifier. The above codes and actions can be implemented with conventional I/O instructions, memory access instructions, CPU arithmetic instructions, CPU logic instructions, and CPU control instructions. In view of this disclosure, the codes may be implemented by one of ordinary skill in the art without undue experimentation.

Figure 8:
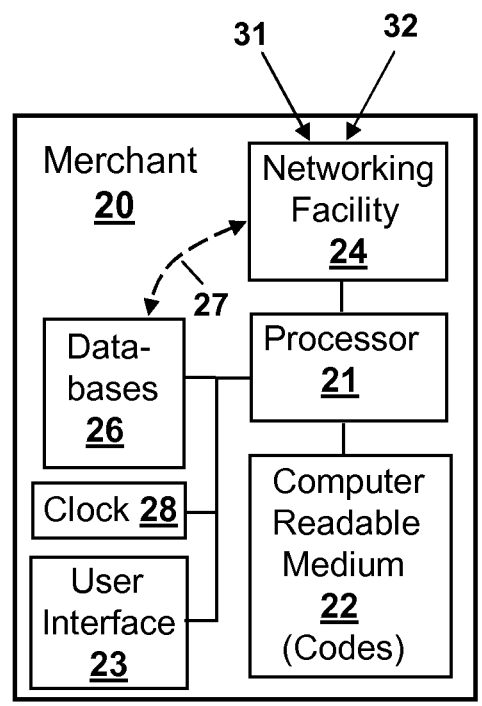
FIG. 8 illustrates an exemplary merchant computer.

Exemplary Merchant Computer 20 may comprise a system having one or more servers coupled to a communications networks 31 and 32 that can interact with the user through computer 10 to arrange a purchase transaction and receive identification information and other information regarding the transaction from validation entity 80 to process (e.g., to correlate with open transactions and to complete correlated open transactions). One of the servers of merchant 20 is shown in FIG. 8; the server comprises one or more processors 21 electrically coupled to each of a tangible computer-readable medium 22, a operator interface 33, one or more databases 26, and a networking facility 24, the latter of which is coupled to first and second communications networks 31 and 32. User interface 23 comprises one or more video output devices (e.g., displays, screens) and one or more input devices (e.g., keyboard, mouse, trackball, etc.), which enable an administrator of Merchant 20 to receive information from the server and to provide input to the server. Computer-readable medium 22 may comprise a combination of semiconductor memory and non-volatile storage, such as one or more disk drives and/or non-volatile memory.

Computer-readable medium 22 stores an operating system for the server, which enables processes and applications to be run by processor(s) 21, and enables codes for directing the operation of processor(s) 21 to be run. The operating system provides services to these processes and applications, and enables these processes and applications to access components of user interface 23, portions of computer-readable medium 22, networking facility 24, and other components of merchant 20. The operating system may be full featured. Specifically, the operating system provides one or more I/O communications modules that enable processor(s) 21 to communicate with user interface 23 and databases 26. Each I/O communications module has an application programming interface (API) with a collection of functions that a processor 21 can call in order to access the components. The operating system of Merchant computer 20 also comprises one or more network services modules that can access networking facility 24 and set up communications sessions to entities on communications networks 31 and 32. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian operating system, and the like. Each of these network services modules can be non-exclusive (e.g., capable of serving more than one processor and more than one process/application) and each provides an application programming interface (API), which has a collection of functions that a processor 21 can call in order to manage communications with another entity. With these API facilities, a collection of API function calls can be readily constructed for a processor to execute that enables the processor to establish a communications channel with an entity on a communications network coupled to networking facility 24, and to exchange messages and data with the entity. The above operating system, modules, and APIs all include instructions that direct the operation of processor(s) 21.

One or more databases 26 may be configured as database servers, which processor(s) 21 can access via networking facility 24 over a private communications network 27, which is illustrated by the dashed line in FIG. 8. Merchant computer 20 conventionally has a clock 28 for tracking time and dates for various applications. Clock 28 may be a simple counter of seconds, or fractions thereof, that can be read by processor 21 by an I/O operation, or may comprise a more complex arrangement of hardware or firmware that can provide the various components of the current date and time (year, month, day, hour, minute, and second) in various registers that can be read by processor 21 through the execution of one or more I/O operations.

Merchant computer 20 comprises a plurality of codes embodied on computer-readable medium 22 for directing data processor(s) 21 to conduct various actions. Merchant computer 20 may comprise a first code that directs data processor(s) 21 to present a website portal to computers 10 that provides various web pages that enable users 1 to select products and/or services for purchase, and that provides each such user with a checkout web page where the user's payment information can be entered. The first code may direct data processor(s) 21 to require the user to login into the user's previously-created merchant-side account before reaching the checkout web page. In this manner, merchant computer 20 will know the user's name, which will enable it to correlate validated identification information from validation entity 80 to the active purchase session. The user merchant-side account may also store the account numbers of one or more portable consumer devices 5, or the last four digits thereof, that user has registered for use at the merchant site. The above aspects of the first code may be implemented by generating and outputting various HTML and XML pages to the user's computer 10, and other codes known to the art for implementing online merchant websites. This aspect of the first code is known to the art and can be implemented by one of ordinary skill in the art without undue experimentation.

As a novel aspect compared to the prior art, the first code may further direct data processor(s) 21 to provide a transaction identifier within the URID of the checkout web page or within the contents of the checkout web page, such as in an HTML or XML field, or the like, where the field may be visible or hidden. This transaction identifier can be read by verification token 40, as described above, and feedback to merchant computer 20 via validation entity 80 along with the identification information of a portable consumer device 5, and can thus further help merchant computer 20 correlate information from validation entity 80 to one of the active purchase sessions being handled by processor(s) 21 under the direction of the first code. An another novel aspect, the first code may further direct data processor(s) 21 to provide a merchant identifier within the URID of the checkout web page or within the contents of the checkout web page, such as in an HTML or XML field, or the like, where the field may be visible or hidden. In those cases where device 5, token 40, and/or validation entity 80 are not co-branded with the merchant, the merchant identifier will enable validation entity to determine the identity of the merchant and the communication channel (e.g., URID) to use to relay information to the merchant. The above novel aspects can be implemented with HTML, XML code, or the like, without undue experimentation by one of ordinary skill in the art in view of this disclosure. As a further novel aspect, the first code may direct data processor(s) 21 to create a data structure stored in tangible computer readable memory that lists each active purchase session and the user's name, the identity of the user's merchant-side account, and/or transaction identifier for each active purchase session. In order to facilitate the ability to send inter-process communications, the data structure also preferably lists the corresponding process identification number for the purchase session. Typically, the first code will direct the data processor(s) 21 to create a respective process thread for each active purchase session, where each process thread will execute a section of the first code for the active purchase session. As another approach where the network address (e.g., IP address of the user's computer 10 is used for the transaction identifier), the first code may direct data processor(s) 21 to create a data structure stored in tangible computer readable memory that lists each active purchase session, the network address of the corresponding user computer for that active purchase session, and corresponding process identification number for the purchase session. (This data structure may optionally include the user names and identities of their merchant-side accounts. In view of this disclosure, this aspect of the first code can be readily implemented using conventional computer control and memory access instructions by one of ordinary skill in the art without undue experimentation.

Merchant computer 20 may further comprise a second code that directs data processor(s) 21 to receive messages from validation entity 80, and to correlate the data in each received message to one of the active purchase sessions. A secure communication channel may be established between merchant computer 20 and validation entity 80, and the second code may direct data processor(s) 21 to handle the session encryption keys and mutual authentication with validation entity 80, which may include decrypting the data sent in the messages form entity 80. In the case where device 5 is cobranded with the merchant, the second code may direct data processor(s) 21 to identify the user's merchant-side account based upon the account number received in the information sent by validation entity 80, and to thereafter identify the active purchase session based upon the identity of the merchant-side account. In some cases, this can be simplified when the identification information of device 5 contains the identity (e.g., account number) of the user's merchant-side account. In cases where token 40 is cobranded with the merchant, validation entity 80 may send the serial number of token 40 to merchant computer 20, and the second code can direct data processor(s) 21 to identify the user's merchant-side account based upon the serial number of the token (the serial number being uniquely assigned among the tokens), and to thereafter identify the active purchase session based upon the identity of the merchant-side account. In cases with device 5 and token 40 are not cobranded with merchant 20, and the second code can direct data processor(s) 21 to identify the user's merchant-side account based upon the user name provided in the data sent by entity 80. In cases where there are several user merchant-side accounts with the same user name, the second code may direct processor(s) 21 to select the merchant-side account that is active, and/or the merchant-side account that has the same address information or network address of computer 10 as present in the data sent by entity 80, and/or the merchant-side account that has a previously-registered bank account number (PAN), or portion thereof, that is the same that as provided in the message from entity 80. Also, if a transaction identifier is present within the message sent by entity 80, the second code may direct data processors(s) 21 to identify the active purchase session based upon the transaction identifier received from entity 80. As indicated above, this transaction identifier may comprise the network address (e.g., IP address) of the user's computer 10. For these various correlation approaches, the second code may direct data processors(s) 21 to access one of the above-described data structures of active purchase sessions created under the direction of the first code. In view of this disclosure, the second code can be readily implemented by one of ordinary skill in the art without undue experimentation using computer control and memory access instructions, function calls to network services, operating system calls, database function calls, etc.

Once the active purchase session is identified by data processors(s) 21, the second code may direct data processor(s) 21 to send the data provided in the message from entity 80 to the identified (e.g., correlated) active purchase session. This can be done by a inter-process communication of data from the process thread that is executing the second code to the process thread that is executing a section of the first code for the active purchase session. The inter-process communication may be accomplished by appropriate function calls to the operating system, which are known to the art. In response to receiving the inter-process communication, the process thread for the active purchase session accepts the provided data and updates its data structure with the received payment information present in the data. This can include placing the substitute account number as the PAN for the transaction, and placing the payment processing number in an appropriate discretionary field that is pre-agreed upon with payment processing network 70. This action may be directed by a section of the first code that is being executed by the process thread for the active purchase session. This part of the first code may comprises a third code that directs data processor(s) 21 to resend the merchant checkout page to the user's computer 10 with an indication that the payment information has been received. This indication may take the form of providing a merchant checkout page with asterisk characters filling in the fields for the payment information. The process thread, under the direction of the first code, is now ready to receive the user's final approval and commitment to the purchase, such as by waiting for and receiving the user's submission of the checkout page, such as by the user's clicking on the "Submit" button or "Continue" button on the checkout page. Once the user's submission is received, the first code directs data processor(s) 21 to submit the standard transaction approval request, which is sent to payment processing network 70, which is typically sent by way of acquiring bank 50. In view of this disclosure, the second code can be readily implemented by one of ordinary skill in the art without undue experimentation using computer control and memory access instructions, function calls to network services, operating system calls, database function calls, etc It may be appreciated that in some co-branded embodiments, validation entity 80 and merchant computer 20 may be two components owned and operated by a merchant.

In view of the above discussion, it may be appreciated that a method that can be conducted by a merchant may comprise: presenting, from a server, a website portal providing various web pages that enable a plurality of users to select at least one product or service for purchase, the code directing the data processor to create an active purchase session for each user that is actively pursuing a purchase; receiving messages from one or more validation entities, each validation messaging including data representative of at least a portion of the identification information of a portable consumer device; and correlating the information received in a message from a validation entity to an active purchase session.

Further Embodiments

In some of the above exemplary embodiments, the merchant website 20 provides a transaction identifier on its merchant checkout page, and verification token 40 obtains the transaction identifier and sends it to validation entity 80. In turn, entity 80 can send the transaction identifier to merchant 20 with the other information it normally sends so that merchant 20 can correlate the information received from entity 80 to an active purchase session. It is also possible that validation entity 80 can generate this transaction identifier and send it to both verification token 40 and merchant 20 to assist in the correlation process at the merchant computer. The transaction identifier may take the form of a "dummy" personal account number (PAN) generated by entity 80, and which token 40 enters into the PAN field of the merchant checkout page. The dummy PAN may start with a sequence of numbers that the merchant recognizes as a dummy PAN (e.g., a dummy bank code), and may be unique over a certain time duration, such as a week (e.g., enough time to complete and process the transactions. User 1 submits the merchant checkout page, and the merchant computer system 20 scans the PAN and recognizes it as a dummy PAN, and then examines a queue of messages from entity 80 for a matching message having the same dummy PAN as the transaction identifier. When found, merchant computer system 20 uses the payment information contained in the matching message. Instead of providing the transaction identifier as a dummy PAN to be placed in the PAN field of the checkout page, the merchant may provide a separate field in the checkout page to enter it, and a separate button for the user to click to submit the transaction number to the merchant. Merchant 20 can then response by resending an updated checkout page that acknowledges receipt of the payment information, and the user can commit to the purchase by clicking the "Submit" button or "Continue" button. Merchant computer system 20 may further comprise codes that direct processor(s) 21 to perform the above actions. Validation entity 80 may further comprise codes that direct its processor(s) 81 to generate a transaction identifier and to send the transaction identifier to both verification token 40 and merchant computer system 20. Verification token 40 may further comprises codes that direct its processor 41 to receive the transaction identifier and to enter it on a designated field of the merchant checkout page, such as the PAN field or another field provided by the merchant. The code is similar in construction to the code that directs processor 41 to enter the dCVV2 value into the CVV field of the merchant checkout page.

In each of the embodiments described herein, the communications between computer 10 and validation entity 80 may be facilitated by, and/or conveyed through, a gateway (e.g., a proxy server, server entity, etc.) that is disposed between computer 10 and validation entity 80. Such a gateway is shown at 90 in FIG. 9. Gateway 90 may act as an intermediary between a plurality of verification tokens 40-A, 40-B, . . . and their associated computers 10-A, 10-B, . . . on the one side, and a plurality of validation entities 80-A, 80-B, . . . on the other side. Tokens 40-A, 40-B, . . . may be constructed and configured the same as token 40 shown in FIG. 1, and may interact with respective computers 10-A, 10B, . . . , respective users 1-A, 1-B, . . . , and respective portable consumer devices 5-A, 5-B, . . . Computers 10-A, 10B, . . . may be the same as computer 10 shown in FIG. 1, and may be coupled to the first communications networks 31, as described above. First communications network 31, second communications network 32, merchant websites 20, acquiring banks 50, issuing banks 60, and payment processing network 70 are coupled to one another as described above. First and second communications networks 31, 32 are also coupled to a plurality of validation entities 80-A, 80-B, 80-C, . . . , each of which may be constructed and configured the same as validation entity 80 shown in FIG. 1.

In the below discussion of the embodiments and implementations shown in FIG. 9, a reference number without a suffix -A, -B, or -C generically refers to each of the suffixed items (e.g., entity 80 refers to each of 80-A, 80-B, 80-C).

Gateway 90 may receive one or more initial communications from one of verification tokens 40-A, 40-B, . . . (via one of computer 10-A, 10B, . . . in communication with the token), and may determine from information in the initial communication(s) an appropriate one of a plurality of validation entities 80-A, 80-B, 80-C, . . . to use to fulfill the token's request. For example, each verification token 40-A, 40-B, . . . may be configured to operate with portable consumer devices 5 issued by many different issuing banks 60 or other such entities, and one or more of the validation entities 80 may be configured to process requests from portable consumer devices 5 issued by respective issuing banks 60 or other such entities. Gateway 90 may determine an appropriate one of validation entities 80-A, 80-B, 80-C, . . . based upon the identification information that the token read from a portable consumer device and sent to the gateway in an initial communication. For example, a portion of the account number in the identification information may comprises an unique identifier assigned to the bank 60 that issued the portable consumer devices 5 from which the identification information was read.

In one implementation, after gateway 90 has determined an appropriate validation entity for the token's request, the gateway may redirect the token to conduct further communications with the determined appropriate validation entity, or may direct the determined validation entity to contact the token to conduct further communications. In another implementation, all communications between the verification token and the determined appropriate validation entity may be conveyed through gateway 90 (after the gateway has initially determined the identity of the appropriate validation entity based upon one or more initial communications with the token). This latter implementation may comprise relatively simple passing through of communications between the token and the appropriate validation entity with minimal processing by gateway 90, or may comprise having the gateway virtually presenting itself as the appropriate validation entity to the verification token. Such virtual presentation may involve gateway 90 decrypting each message from the verification token, communicating with the appropriate validation entity to formulate a response to the token's message, and encrypting and sending a response message to the verification token. In each of the above implementations, and in other implementations, gateway 90 may also conduct one or more validation tests on behalf of the appropriate validation entity, particularly those related to validating the verification token. In this case, the gateway does not need to send to the determined appropriate validation entity those communications it receives from the token that pertain to validation tests that the gateway is handling. Gateway 90 may be associated with, or operated by, payment processing network 70 or the owner thereof. It may be appreciated that, in each of these implementations, Gateway 90 acts as an entity that can provide a device verification value (dCVV2 value) to token 40, just as in the case that validation entity 80 can provide a device verification value to token 40 when entity 80 is directly contacted by token 40.

Figure 9:
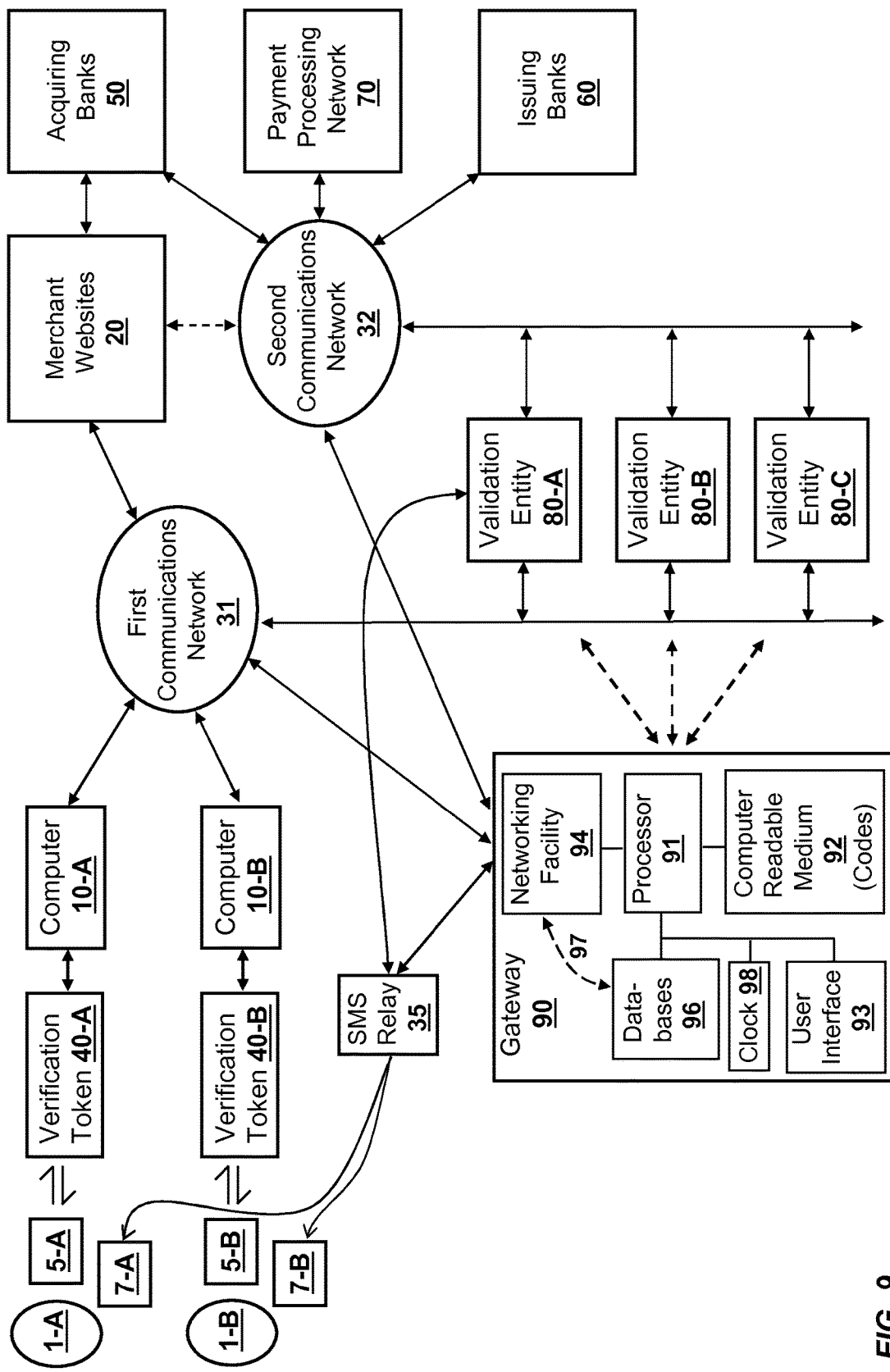
FIG. 9 illustrates additional exemplary embodiments of the invention.

Referring to FIG. 9, gateway 90 comprises a system having one or more servers coupled to a communications network that can receive a request from a verification token 40 to process, as described above. One of the servers of gateway 90 is shown in FIG. 9; the server comprises one or more processors 91 electrically coupled to each of a tangible computer-readable medium 92, a user interface 93, one or more databases 96, and a networking facility 94, the latter of which is coupled to first and second communications networks 31 and 32. User interface 93 comprises one or more video output devices (e.g., displays, screens) and one or more input devices (e.g., keyboard, mouse, trackball, etc.), which enable an administrator of gateway 90 to receive information from the server and to provide input to the server. Computer-readable medium 92 may comprise a combination of semiconductor memory and non-volatile storage, such as one or more disk drives and/or non-volatile memory.

Computer-readable medium 92 stores an operating system for the server, which enables processes and applications to be run by processor(s) 91, and enables codes for directing the operation of processor(s) 91 to be run. The operating system provides services to these processes and applications, and enables these processes and applications to access components of user interface 93, portions of computer-readable medium 92, networking facility 94, and other components of entity 90. The operating system may be full featured. Specifically, the operating system provides one or more I/O communications modules that enable processor(s) 91 to communicate with user interface 93 and databases 96. Each I/O communications module has an application programming interface (API) with a collection of functions that a processor 91 can call in order to access the components. The operating system of entity 90 also comprises one or more network services modules that can access networking facility 94 and set up communications sessions to entities on communications networks 31 and 32, and with SMS relay server 35. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian operating system, and the like. Each of these network services modules can be non-exclusive (e.g., capable of serving more than one processor and more than one process/application) and each provides an application programming interface (API), which has a collection of functions that a processor 91 can call in order to manage communications with another entity. With these API facilities, a collection of API function calls can be readily constructed for a processor to execute that enables the processor to establish a communications channel with an entity on a communications network coupled to networking facility 94, and to exchange messages and data with the entity. The above operating system, modules, and APIs all include instructions that direct the operation of processor(s) 91.

One or more databases 96 may be configured as database servers, which processor(s) 91 can access via networking facility 94 over a private communications network 97, which is illustrated by the dashed line in FIG. 9. Gateway 90 conventionally has a clock 98 for tracking time and dates for various applications. Clock 98 may be a simple counter of seconds, or fractions thereof, that can be read by processor 91 by an I/O operation, or may comprise a more complex arrangement of hardware or firmware that can provide the various components of the current date and time (year, month, day, hour, minute, and second) in various registers that can be read by processor 91 through the execution of one or more I/O operations.

Gateway 90 may comprise code embodied on computer-readable medium 92 that directs data processor 91 to communicate with a computer 10 and an associated verification token 40 using networking facility 94 over communications network 31. This code may include instructions that establish a communications session with computer 10, including the option of establishing an SSL session with mutual authentication and encryption based on a triple DES algorithm, and instructions for sending and receiving messages to verification token 40 through the communications session. Gateway 90 may further comprise code embodied on computer-readable medium 92 that directs data processor 91 to receive encrypted identification information sent by verification token 40, and code that directs data processor 91 to decrypt the encrypted identification information. The identification information may be encrypted by a session key of an SSL session or by an encryption key stored in verification token 40 and known to gateway 90, or may be doubly encrypted by both keys. The latter key may be uniquely assigned to the token, as described above. Gateway 90 may further comprise code embodied on computer-readable medium 92 that directs data processor 91 to determine, from the received identification information and/or the token's identity (e.g., the token's serial number), the appropriate one of the validation entities 80-A, 80-B, 80-C, . . . to be used for further processing of the request from verification token 40. For this, data processor 91 may access one of databases 96 for a correlation list that relates identification information (or portions thereof) to validation entities 80, and/or for a correlation list that relates token identifiers to validation entities 80, and may then compare the information received from the token 40 with the correlation list(s) to determine the appropriate one of the validation entities 80. Gateway 90 may further comprise code embodied on computer-readable medium 92 that directs data processor 91 to apply one or more validation tests as previously described above, and to continue processing the request from token 40 if a selected number of validation tests are passed. Various ways of continuing the processing are described below in various possible implementations of gateway 90. The above codes for gateway 90, and codes for gateway 90 described below, may be implemented in any number of programming languages. Furthermore, one of ordinary skill in the art will be readily able to construct instructions to implement these codes in view of this disclosure without undue experimentation.

In one implementation, gateway 90 may further comprise code embodied on computer-readable medium 92 that directs data processor 91 to send a communication to token 40 (by way of its associated computer 10) informing the token to contact the determined appropriate validation entity 80 to process its request. This communication may include a URID for the determined appropriate validation entity. Token 40 may then communicate with the determined appropriate entity 80 as described above, and no changes to entity 80 are needed. In this implementation of gateway 90, the code may further direct data processor 91 to send a communication to the determined appropriate validation entity 80 that informs the entity of the request from the token 40 (along with an indication of the identification information sent by token 40), and informs the entity that the token 40 will be contacting it for a dCVV2 value for the identification information (as sent to gateway 90 by the token 40). This communication by gateway 90 can serve as an additional security measure that assures the appropriate validation entity 80 that the subsequent contact by token 40 is legitimate.

In another implementation, gateway 90 may further comprise code embodied on computer-readable medium 92 that directs data processor 91 to send a communication to the determined appropriate validation entity 80 with the identification information and other information received from the verification token 40, and with a request for the validation entity to process the request and to send the dCVV2 value or other information as outlined above to the verification token 40 (by way of its associated computer 10). This communication to the determined appropriate validation entity 80 may include a URID for the verification token 40. The codes of the validation entity 80 previously described above may be augmented to direct the entity's processor 81 to receive above-described communication from gateway 90, and to initiate communications with the requesting token 40. The codes of validation entity 80 need not need to direct the entity's processor 81 to receive the identification information from the requesting token (as that may have been provided to the entity by gateway 90); however, as an added security measure, the requesting token 40 may provide the identification information to entity 80, and the entity may include the code to receive the identification information and other information from the token. In this implementation of gateway 90, the code for gateway 90 may further direct data processor 91 to send a communication to the verification token 40 (via the associate computer 10) informing the token that the determined appropriate validation entity 80 will be communication with it to potentially send a dCVV2 value.

Other exemplary embodiments for Gateway 90 are possible, and are described in co-pending patent application Ser. No. 12/780,657, entitled "Verification of Portable Consumer Devices," filed May 14, 2010, the contents which is incorporated in their entirety by reference for all purposes.

From the above description, it may be appreciated that validation entities 80 and gateway 90 are separate entities from computers 10, and are separate entities from verification tokens 40. It may also be appreciated that in several embodiments and implementations thereof that computers 10, validation entities 80, and gateway 90 are addressed as separate network nodes on communications network 31 (e.g., have different network addresses in the communication packets), and that tokens 40 communicate through the network nodes of computers 10 to entities 80 and/or gateway 90 (e.g., computers 10 construct and decode network communication packets for tokens 40). It may be also appreciated that, in several embodiments and implementations of token 40, token 40 may unconditionally send the read identification information to validation entity 80 and/or gateway 90 without requiring a validation between the token and the user, such as may be provided by the entry of a PIN or the provision of a biometric sample (e.g., fingerprint); and that token 40 may send the read identification information in a relatively short amount of time (such as within one minute of being read, and typically within ten seconds).

Embodiments of the invention are not limited to the above-described embodiments. For example, although separate functional blocks are shown for an issuer, payment processing system, and acquirer, some entities perform all of these functions and may be included in embodiments of invention.

It should be understood that various embodiments of the present invention as described above can be implemented in the form of control logic using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application, may be implemented as software code to be executed by a processor using any suitable computer language such as, for example, C, C++, C#, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

The above description is illustrative and is not restrictive. Many variations of the invention and embodiments thereof will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A validation entity computer comprising a first data processor and a computer program product embodied on a tangible computer-readable medium coupled to the first data processor to implement a method comprising:
   directing the first data processor to receive identification information of a portable consumer device read and sent by a verification token over a communications network with a second data processor in a user computer, the second data processor disposed between the verification token and the communications network, the verification token being coupled to the second data processor in the user computer by way of a peripheral interface of the user computer
   directing the first data processor to apply at least one validation test on a piece of information sent by the verification token, the validation test producing a result of pass or fail; and
   directing the first data processor to send, if the result of the at least one validation test is pass, data representative of at least a portion of the received identification information to a merchant computer.

2. The validation entity computer of claim 1, wherein the method further comprises directing the first data processor to receive a serial number of the verification token and a test message encrypted by the verification token with an encryption key; and
   wherein directing the first data processor to apply at least one validation test comprises directing the first data processor to access a database to obtain a key and one or more acceptable messages, and directing the first data processor to validate the encrypted test message using the encrypted test message, the obtained key, and the obtained one or more acceptable messages.

3. The validation entity computer of claim 1, wherein the method further comprises directing the first data processor to receive a serial number of the verification token; and
   directing the first data processor to have the received serial number compared with serial numbers stored in a database that stores serial numbers of suspicious tokens.

4. The validation entity computer of claim 1, wherein the method further comprises:
   directing the first data processor to receive one or more data messages having information specific to the user computer, the information being obtained by the verification token, and
   directing the first data processor to have the received information compared with information stored in a database that stores computer-specific information of suspicious computers for a match.

5. The validation entity computer of claim 1 wherein the received identification information is conveyed by way of a network packet passing through the communications network, and wherein directing the first data processor to apply at least one validation test comprises:
   directing first the direct processor to obtain a source IP address from the network packet; and directing first the data processor to have the obtained source IP address compared with suspect IP addresses stored in a database for a match.

6. The validation entity computer of claim 1, wherein the received identification information includes an account number of the portable consumer device and a digital fingerprint of a magnetic stripe of the portable consumer device; and
wherein directing the first data processor to apply at least one validation test comprises instructions that direct the first data processor to obtain a valid digital fingerprint for the portable consumer device having the account number in the received identification information, and to compare the digital fingerprint in the received identification information to the valid digital fingerprint.

7. The validation entity computer of claim 1, wherein the received identification information includes an account number of the portable consumer device and a variable datum that varies each time the portable consumer device is read for its identification information; and
wherein directing the first data processor to apply at least one validation test comprises instructions that direct the first data processor to obtain one or more acceptable datum values for the portable consumer device having the account number in the received identification information, and to compare the variable datum in the received identification information to the obtained one or more acceptable datum values for a match.

8. The validation entity computer of claim 1, wherein the received identification information includes an account number of the portable consumer device and a variable datum that varies each time the portable consumer device is read for its identification information; and
wherein directing the first data processor to apply at least one validation test comprises instructions that direct the first data processor to send the account number and the variable datum to an issuing bank with a request for the bank to determine if the variable datum is valid, and instructions that direct the first data processor to receive the issuing bank's determination.

9. The validation entity computer of claim 1, wherein directing the first data processor to apply at least one validation test comprises instructions that direct the first data processor to apply at least two validation tests pertaining to the received identification information.

10. A method of communicating payment information to a merchant, the method comprising:
receiving, at a server, identification information of a portable consumer device read and sent by a verification token over a communications network with a data processor in a user computer disposed between the verification token and a communications network, the verification token being coupled to the data processor in the user computer by way of a peripheral interface of the computer;
selecting, by the server, a merchant to send data representative of at least a portion of the received identification information to; and
sending, from the server, data representative of at least a portion of the received identification information to a merchant computer of the selected merchant.

11. The method of claim 10, wherein the identification information has an account number associated with a user, wherein selecting the merchant comprises identifying the selected merchant from a portion of the account number.

12. The method of claim 10, wherein the identification information has a personal account number that comprises a bank number and a user number, wherein selecting the merchant comprises extracting the bank number in the personal account number of the identification information and identifying the selected merchant from the extracted bank number.

13. The method of claim 10, wherein the identification information is received by the server in the form of a request that includes a merchant identifier, and wherein selecting the merchant comprises identifying the selected merchant from the received merchant identifier.

14. The method of claim 10, wherein the identification information is received by the server in the form of a request that includes a merchant identifier, and wherein selecting the merchant comprises selecting a single merchant for processing the request before the request is received.

15. The method of claim 10, further comprising:
applying at least one validation test pertaining to the identification information received by the server before sending the data representative of at least the portion of the received identification information to the merchant computer of the selected merchant.

16. The method of claim 15, wherein applying at least one validation test comprises:
receiving a serial number of the verification token; and
comparing the received serial number with serial numbers of suspicious tokens.

17. The method of claim 15, wherein applying at least one validation test comprises:
receiving one or more data messages having information specific to the user computer, the information being obtained by the token, and
comparing the received information with computer-specific information of suspicious computers for a match.

18. The method of claim 15 wherein the identification information is conveyed by way of a network packet through the communications network, and wherein applying at least one validation comprises:
obtaining a source IP address from the network packet; and
comparing the obtained source IP address with suspect IP addresses for a match.

19. The method of claim 10, wherein applying at least one validation test comprises:
receiving a serial number of the verification token and a test message encrypted by the verification token by an encryption key;
obtaining a key and one or more acceptable messages; and
validating the encrypted test message using the encrypted test message, the obtained key, and the obtained one or more acceptable messages.

* * * * *